US011836683B2

(12) United States Patent
Saunier

(10) Patent No.: US 11,836,683 B2
(45) Date of Patent: Dec. 5, 2023

(54) SYSTEMS AND METHODS FOR ELECTRONIC LESSON MANAGEMENT

(71) Applicant: Wyn.net, LLC, Winchester, KY (US)

(72) Inventor: Wyn Saunier, Naples, FL (US)

(73) Assignee: WYN.NET, LLC, Winchester, KY (US)

( * ) Notice: Subject to any disclaimer, the term of this patent is extended or adjusted under 35 U.S.C. 154(b) by 627 days.

(21) Appl. No.: 16/240,115

(22) Filed: Jan. 4, 2019

(65) Prior Publication Data

US 2019/0213560 A1 Jul. 11, 2019

Related U.S. Application Data

(60) Provisional application No. 62/613,998, filed on Jan. 5, 2018.

(51) Int. Cl.
| | |
|---|---|
| G06F 3/048 | (2013.01) |
| G06Q 10/1093 | (2023.01) |
| G06Q 50/20 | (2012.01) |
| G06F 9/54 | (2006.01) |
| G06F 3/0482 | (2013.01) |
| G07C 1/10 | (2006.01) |

(52) U.S. Cl.
CPC ....... *G06Q 10/1097* (2013.01); *G06F 3/0482* (2013.01); *G06F 9/542* (2013.01); *G06Q 50/205* (2013.01); *G07C 1/10* (2013.01)

(58) Field of Classification Search
CPC .. G06Q 50/205; G06Q 50/20; G06Q 50/2053; G06Q 10/10; G06Q 10/1097; G09B 5/00; G09B 5/02; G09B 5/06; G09B 5/14; G09B 19/00; G06F 9/542; G06F 3/0482
See application file for complete search history.

(56) References Cited

U.S. PATENT DOCUMENTS

| | | | | |
|---|---|---|---|---|
| 8,182,270 | B2* | 5/2012 | Elzinga | G09B 5/00 434/322 |
| 8,224,757 | B2* | 7/2012 | Bohle | G06Q 10/10 705/326 |
| 8,412,736 | B1* | 4/2013 | Arnold | G06F 16/2465 707/776 |
| 8,764,454 | B1* | 7/2014 | Turner | G09B 19/00 434/322 |

(Continued)

FOREIGN PATENT DOCUMENTS

| | | |
|---|---|---|
| WO | 2008039040 A1 | 4/2008 |
| WO | 2014127241 A1 | 8/2014 |

OTHER PUBLICATIONS

International Search Report and Written Opinion pertaining to International Application No. PCT/US2019/012464 dated May 1, 2019.

*Primary Examiner* — Steven B Theriault
(74) *Attorney, Agent, or Firm* — Dinsmore & Shohl LLP

(57) ABSTRACT

Systems and methods for electronic lesson management are provided. Some embodiments include creating a new lesson offering, receiving at least one characteristic for the new lesson offering, and predicting a desired roster for the new lesson offering, where the desired roster includes at least one student, and where the desired roster for the new lesson is predicted from the at least one characteristic. Some embodiments include sending an invitation to the at least one student to sign up for the new lesson.

20 Claims, 42 Drawing Sheets

(56) References Cited

U.S. PATENT DOCUMENTS

| | | | |
|---|---|---|---|
| 9,779,084 B2* | 10/2017 | Danson | G06F 40/30 |
| 10,373,511 B2* | 8/2019 | Calmon | G09B 7/00 |
| 10,545,938 B2* | 1/2020 | Hardas | G06Q 30/0203 |
| 11,010,677 B2* | 5/2021 | Terra | G06N 20/00 |
| 11,024,190 B1* | 6/2021 | Henchy | G09B 5/065 |
| 2002/0102525 A1 | 8/2002 | Coppolino | |
| 2003/0200112 A1* | 10/2003 | Royall, Jr. | G06Q 10/10 705/326 |
| 2004/0002888 A1* | 1/2004 | Draper, Jr. | G09B 19/18 705/7.13 |
| 2004/0009462 A1* | 1/2004 | McElwrath | G09B 7/02 434/350 |
| 2004/0161728 A1* | 8/2004 | Benevento, II | G06Q 50/205 434/118 |
| 2004/0193541 A1* | 9/2004 | Lasater | G06Q 40/02 705/39 |
| 2005/0202391 A1* | 9/2005 | Allen | G09B 7/00 434/362 |
| 2006/0019222 A1* | 1/2006 | Lelito | G09B 7/02 434/118 |
| 2006/0031083 A1* | 2/2006 | Dalal | G06Q 50/205 709/204 |
| 2006/0105315 A1* | 5/2006 | Shaver | G09B 5/00 434/362 |
| 2008/0021769 A1* | 1/2008 | Higgins | G09B 7/02 705/7.24 |
| 2008/0085502 A1* | 4/2008 | Allen | G09B 5/00 434/365 |
| 2009/0081629 A1* | 3/2009 | Billmyer | G09B 7/02 434/362 |
| 2009/0176511 A1* | 7/2009 | Morrison | H04W 4/02 455/456.3 |
| 2010/0159438 A1* | 6/2010 | German | G06F 16/24573 434/433 |
| 2011/0016057 A1* | 1/2011 | Halpern | G06Q 30/00 705/326 |
| 2012/0030131 A1* | 2/2012 | Gibbons | G06Q 50/2053 705/327 |
| 2012/0054071 A1* | 3/2012 | Griffin | G09B 7/00 705/26.81 |
| 2012/0054118 A1* | 3/2012 | Griffin | G06Q 10/10 705/327 |
| 2012/0231437 A1* | 9/2012 | Fakhrai | G09B 7/00 434/350 |
| 2012/0233084 A1* | 9/2012 | Sardonis | G06Q 10/06 705/326 |
| 2013/0004929 A1 | 1/2013 | Otwell | |
| 2013/0011821 A1* | 1/2013 | Denley | G06Q 50/20 434/350 |
| 2013/0096892 A1* | 4/2013 | Essa | G06F 17/18 703/2 |
| 2013/0310957 A1* | 11/2013 | Rupple | G09B 19/0038 700/91 |
| 2013/0325665 A1* | 12/2013 | Shaffer | G06Q 50/20 705/26.61 |
| 2013/0330702 A1* | 12/2013 | Bowring | G09B 5/08 434/308 |
| 2014/0057239 A1* | 2/2014 | Vehovsky | G09B 5/06 434/322 |
| 2014/0099626 A1* | 4/2014 | Kelly | G09B 5/02 434/362 |
| 2014/0193795 A1* | 7/2014 | Tavolacci | G09B 7/02 434/362 |
| 2014/0195549 A1* | 7/2014 | Ahn | G06F 16/9535 707/749 |
| 2014/0222918 A1 | 8/2014 | Lu et al. | |
| 2014/0227675 A1* | 8/2014 | Budhu | G09B 7/02 434/362 |
| 2014/0272891 A1* | 9/2014 | Saladino | G09B 5/02 434/350 |
| 2014/0279620 A1* | 9/2014 | Lillquist | G06Q 50/2053 705/319 |
| 2014/0342325 A1* | 11/2014 | Wu | G06Q 50/2053 434/219 |
| 2015/0058055 A1* | 2/2015 | Blodgett | G06Q 10/06311 705/7.13 |
| 2015/0149379 A1* | 5/2015 | Dearmon | G06Q 10/00 705/326 |
| 2015/0220880 A1* | 8/2015 | Maipady | G06Q 50/2053 705/327 |
| 2016/0042654 A1* | 2/2016 | Fieldman | G09B 7/00 434/219 |
| 2016/0071424 A1* | 3/2016 | Harney | G09B 5/06 434/350 |
| 2016/0247072 A1* | 8/2016 | Auger | G06F 16/00 |
| 2016/0343269 A1* | 11/2016 | Wright | G09B 5/06 |
| 2017/0053368 A1* | 2/2017 | Brintle | G06Q 10/10 |
| 2017/0124288 A1* | 5/2017 | Gundlapalli | G16H 20/60 |
| 2017/0139762 A1* | 5/2017 | Sherlock | G06F 11/0709 |
| 2017/0140488 A1* | 5/2017 | Caines | G06Q 50/2053 |
| 2017/0154539 A1* | 6/2017 | King | G09B 5/02 |
| 2017/0256109 A1* | 9/2017 | Bhattacharya | G06Q 10/0631 |
| 2017/0257373 A1* | 9/2017 | Furtado | G06Q 10/107 |
| 2018/0040086 A1* | 2/2018 | Desai | G06Q 10/10 |
| 2018/0276205 A1* | 9/2018 | Auger | G09B 5/00 |
| 2019/0138614 A1* | 5/2019 | Shen | G06F 16/24578 |
| 2019/0259293 A1* | 8/2019 | Hellman | G06K 9/6257 |

* cited by examiner

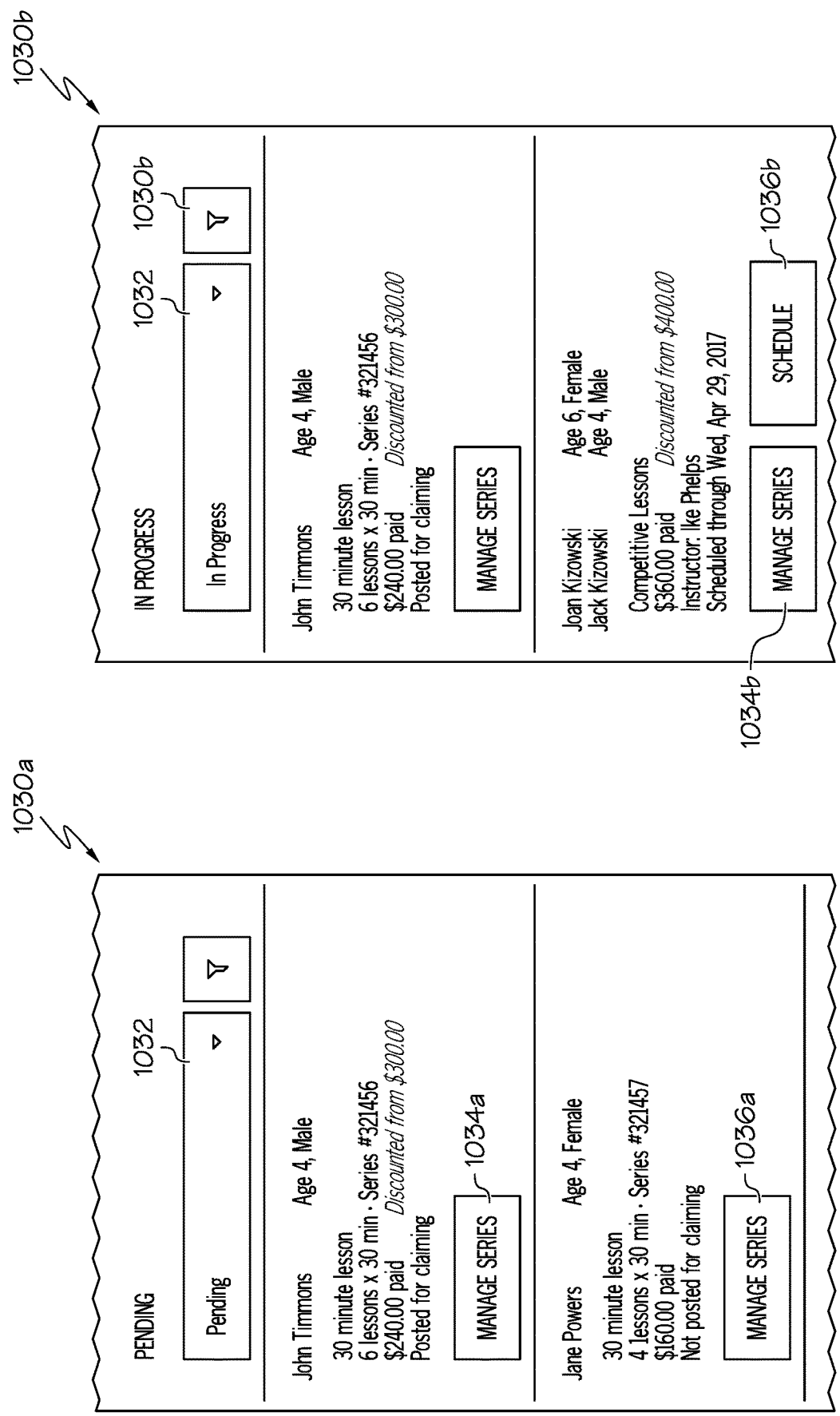

Home / Private Series / #321457

Private Series #321457

Jane Powers     Age 4, Female 30 minute lesson
4 lessons x 30 min · Series #321457
$160.00 paid
Instructor Ike Phelps 1932a → Schedule     Series Details ← 1932b Account Owner
Houston Powers Lesson Details

| Su | M | Tu | W | Th | F | Sa |
|----|---|----|----|----|---|----|

1934

Any special requests? (Time of day, experience level, etc.)

We prefer mornings.

Activity
Registration by H Powers on Oct 9, 2017, at 11:15 AM.
Series posted for claim by Wyn Saunier on
Oct 9, 2017, at 2:33 PM.
Series claimed by Ike Phelps on Oct 9, 2017, at 2:55 PM.

FIG. 19A

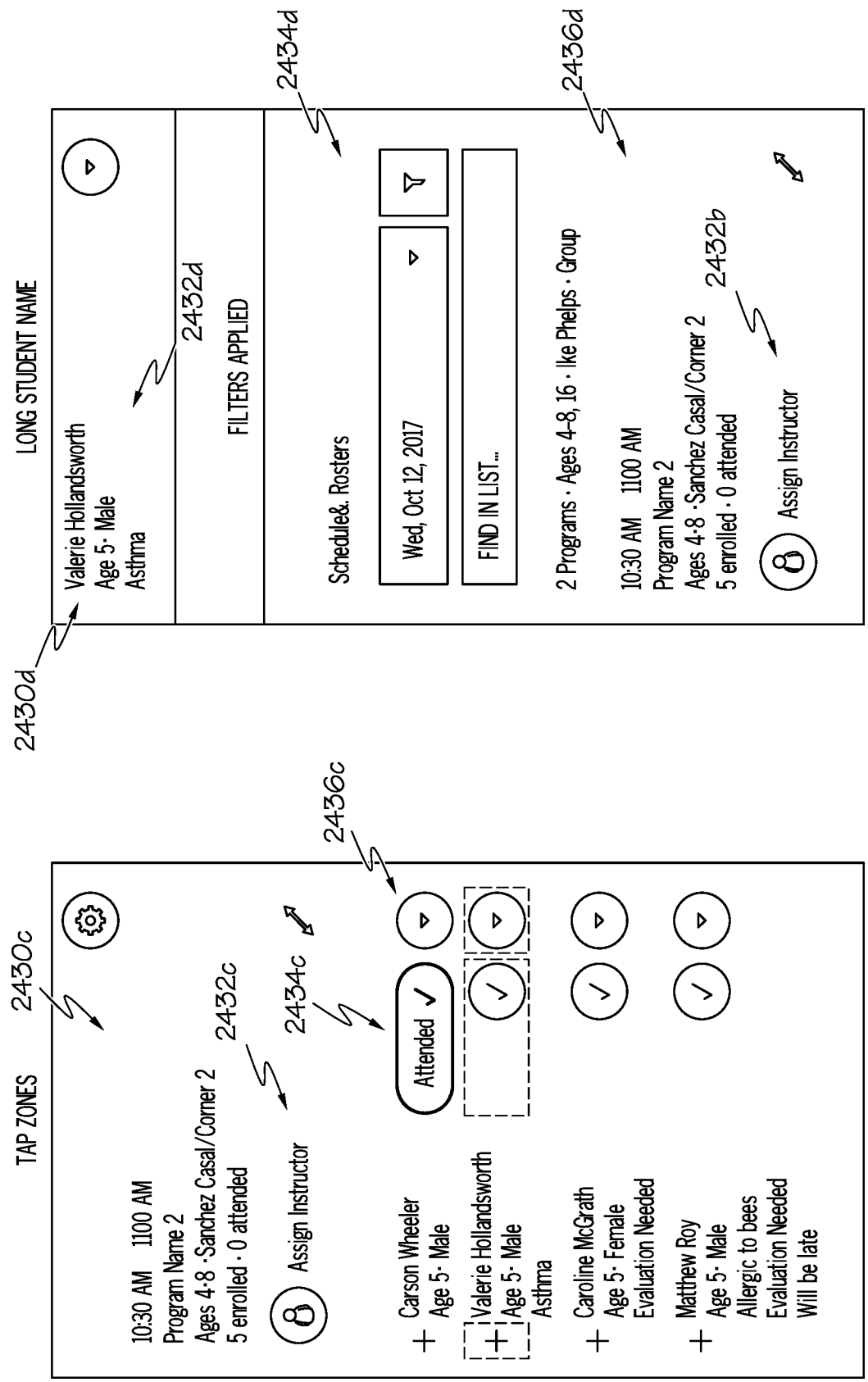

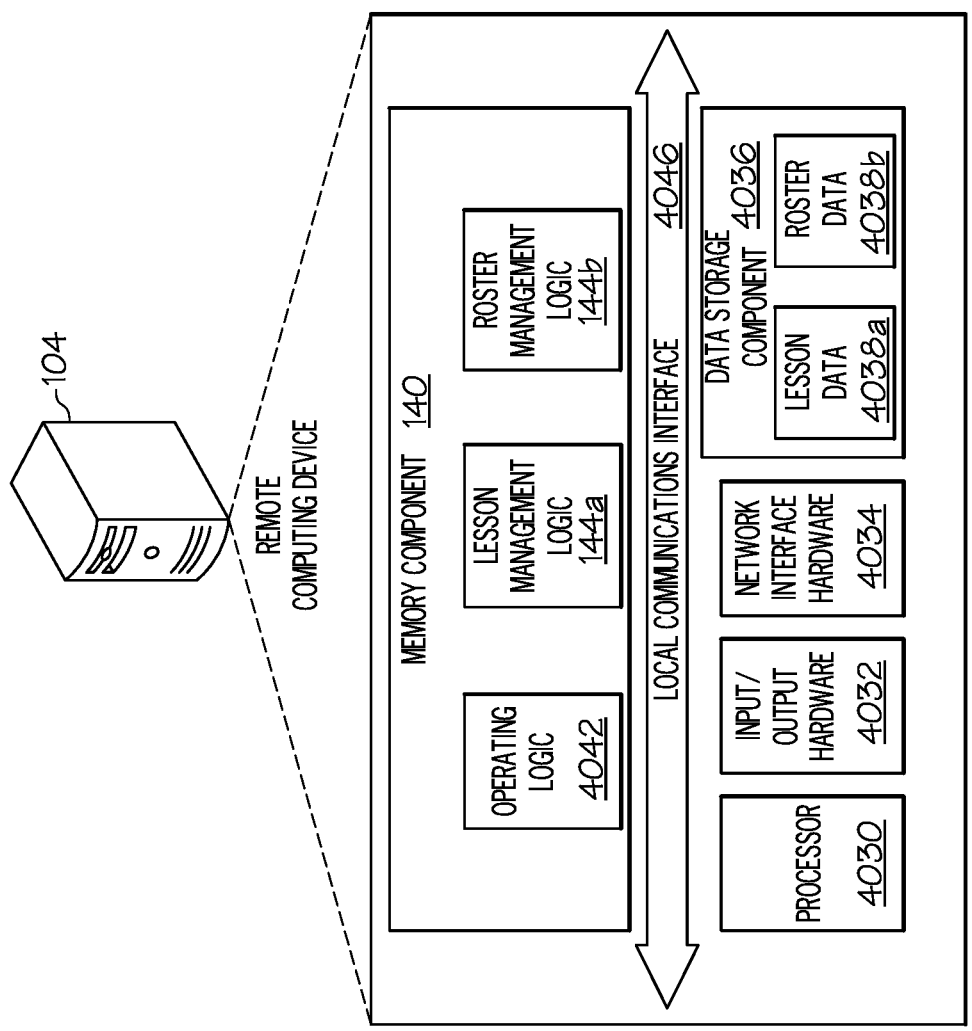

SYSTEMS AND METHODS FOR ELECTRONIC LESSON MANAGEMENT

CROSS REFERENCE

This application claims the benefit of U.S. Provisional Application Ser. No. 62/613,998, which was filed on Jan. 5, 2018 and is hereby incorporated by reference in its entirety.

TECHNICAL FIELD

Embodiments described herein generally relate to systems and methods for electronic lesson management and, more specifically, to embodiments for managing individual athletic lessons, team schedules, events, and the like.

BACKGROUND

People of all ages engage in athletic and other types of lessons. As an example, both children and adults may take tennis, piano lessons, team-based lessons, or the like. While current instructors may have an individual website for signing up for lessons, these current solutions do not provide much of the functionality desired by administrators, instructors, and students.

SUMMARY

One embodiment described herein includes a method for electronic lesson management that includes creating a new lesson offering, receiving at least one characteristic for the new lesson offering, and predicting a desired roster for the new lesson offering, where the desired roster includes at least one student, and where the desired roster for the new lesson is predicted from the at least one characteristic. Some embodiments include sending an invitation to the at least one student to sign up for the new lesson.

Another embodiment described herein includes a memory component that stores logic that, when executed by a computing device, causes the system to create a new lesson offering, receive at least one characteristic for the new lesson offering, and predict a desired roster for the new lesson offering, where the desired roster includes at least one student, and where the desired roster for the new lesson is predicted from the at least one characteristic. In some embodiments, the logic causes the computing device to send an invitation to the at least one student to sign up for the new lesson, receive a response to the invitation, and alter the at least one characteristic of the new lesson offering, based on the response.

Yet another embodiment described herein includes a non-transitory computer-readable medium for electronic lesson management that, when executed by a computing device, causes the computing device to create a new lesson offering, receive, from an administrator, at least one characteristic for the new lesson offering, and predict a desired roster for the new lesson offering, where the desired roster includes at least one student, and where the desired roster for the new lesson is predicted from the at least one characteristic. In some embodiments, the logic causes the computing device to send an invitation to a user that is related to the at least one student to sign up for the new lesson, receive a response to the invitation from the user, and alter the at least one characteristic of the new lesson offering, based on the response.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 10A depicts a user interface for providing pending lessons for the student, according to embodiments described herein;

FIG. 10B depicts an instructor user interface for providing in progress lessons with an instructor, according to embodiments described herein;

FIGS. 11A, 11B depict a student user interface for providing a user with details regarding lessons for a student, according to embodiments described herein;

FIGS. 19A, 19B depict an administrator user interface for providing details of an abandoned lesson, according to embodiments described herein

FIGS. 24A-24D depict varying views of a lesson program, according to embodiments described herein;

FIG. 40 depicts a computing device for providing electronic lesson management.

DETAILED DESCRIPTION

Figure 1:
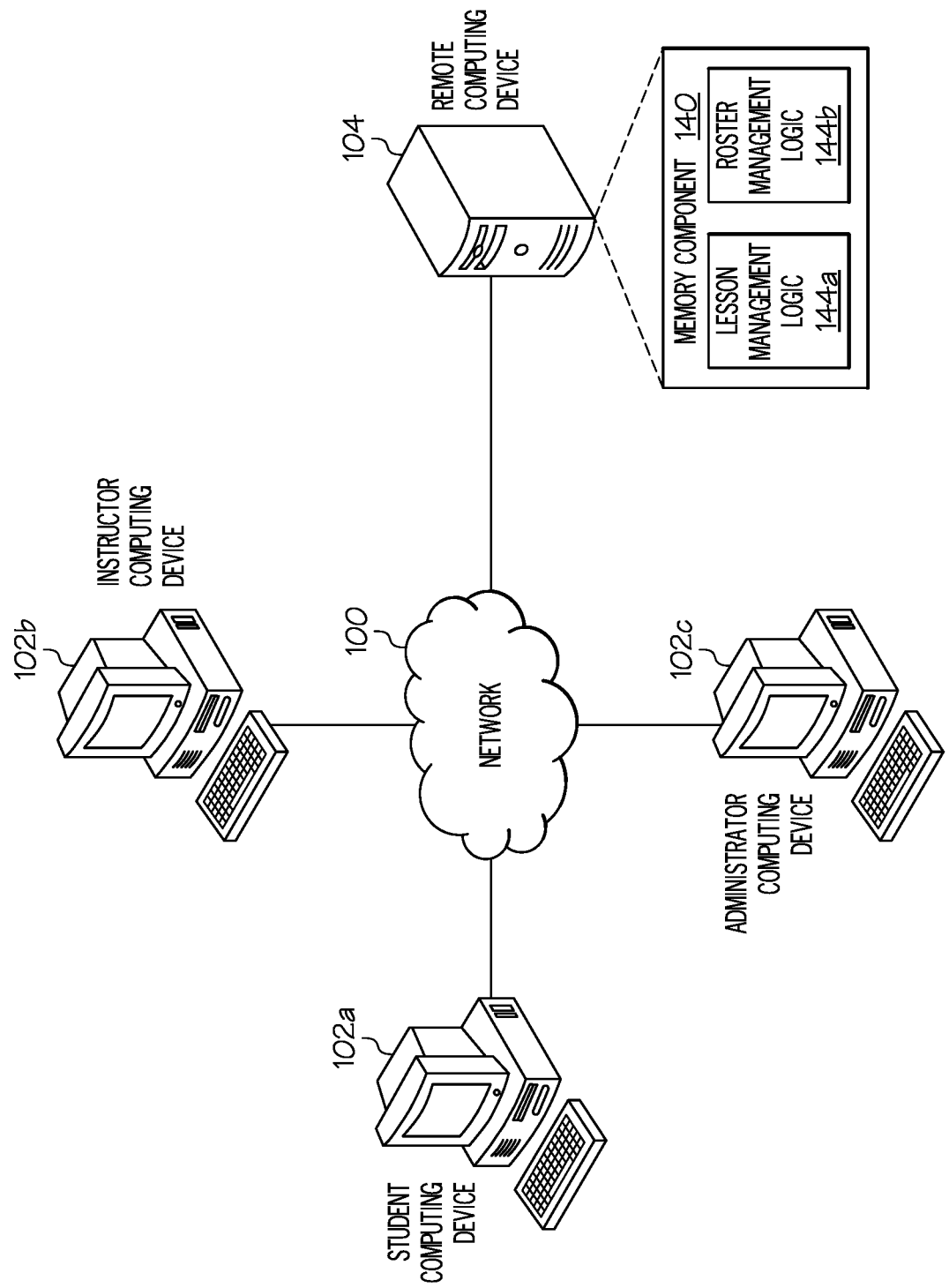
FIG. 1 depicts a computing environment for providing electronic lesson management, according to embodiments described herein.

Embodiments disclosed herein include systems and methods for electronic lesson management. Some embodiments are configured to provide private lesson management. Private lesson management may include setting up private lesson offerings. Once a student is registered, embodiments may be configured manage a lesson series, such as managing students in the private lesson offerings, managing cancellations and changes, and managing other information regarding the student and/or offering. Embodiments may also be configured to provide an interface to assign a lesson series to an instructor and/or to provide instructors with a portal to sign up to instruct an offering. As an example, some embodiments may be configured to determine a new offering; predict a desired roster of students; and, based on the predicted roster of students, determine and provide recommendations regarding lesson times, lesson class size, instructors, etc. The roster may be predicted based on a location of students, a location of instructors, a location of training facilities, a type of lesson, a skill level of a lesson and/or student, a payment history of a student, a user preference, an instructor preference, and/or based on other criteria. Recommendations may also be determined and provided regarding those students who would benefit from private lessons, larger class size, and smaller class size. Similarly, some embodiments may determine that a new lesson offering should be made, based on the current student population and skill level.

Embodiments may also be configured for providing roster management. These embodiments include automatic reassignment of lesson offerings to students. As an example, some embodiments may be configured to provide a user interface with an option associated with a student's name. In response to selection of the option, embodiments may be configured to determine a more desirable offering for the particular student, as well as automatically assign the student to that offering and notify the student and/or user of the change. Similarly, some embodiments may be configured to predict a roster based on current events offered by an instructor, current skill level and schedule of students, and/or based on other criteria.

Some embodiments may be configured for providing a user interface with an option related to a name of the at least one student; in response to receiving selection of the option, determining a new offering for the at least one student; and automatically assigning the at least one student to the new offering. Similarly, some embodiments may notify the at least one student and/or user of reassignment to the new offering.

Similarly, some embodiments may be configured for providing a user interface to a user to provide an add-on event offering; receiving the add-on event offering from an administrator; and receiving indication of registration to the add-on event offering by the user. Some embodiments may include notifying the administrator of a purchase of the add-on event offering; reducing a quantity available of the add-on event offering, and marking the add-on event offering as redeemed. The systems and methods for electronic lesson management incorporating the same will be described in more detail, below.

Referring now to the drawings, FIG. 1 depicts a computing environment for providing electronic lesson management, according to embodiments described herein. As illustrated, the computing environment may include a network 100. The network 100 may include any wide area network (such as the internet, a public switched telephone network, a cellular voice network, a cellular data network, a WiMax network, etc.), local network (such as via Ethernet, wireless fidelity, etc.), and/or may facilitate direct device-to-device communications (such as via Bluetooth, ZigBee, etc.).

Coupled to the network 100 are a student computing device 102a, an instructor computing device 102b, an administrator computing device 102c, and a remote computing device 104. The student computing device 102a may include any computing device, such as a personal computer, laptop, tablet, mobile device, etc. that is configured for communicating input and output to a student (or other user associated with the student, such as a parent, caretaker, etc.). Similarly, the instructor computing device 102b may include any computing device and may be configured for communicating inputs and outputs with an instructor or agent for the instructor. The administrator computing device 102c may include any computing device for communicating inputs and outputs with an administrator. As an example, the administrator may include a third party that hosts the portal, an administrator of a training facility, a coach or teacher, and/or other administrator, depending on the particular embodiment.

Also provided is the remote computing device 104. The remote computing device 104 is depicted in FIG. 1 as a server, but may be configured as one or more devices for providing the functionality described herein. As such, the remote computing device 104 may be configured as one or more servers, personal computers, mobile devices, and/or a combination of these or other computing devices. Regardless of the hardware infrastructure, the remote computing device 104 may include a memory component 140 that stores lesson management logic 144a and roster management logic 144b. As described in more detail below, the lesson management logic 144a may be configured for causing the remote computing device 104 to perform functionality related to creation, deletion, editing, etc. of lessons. The roster management logic 144b may be configured to cause the remote computing device 104 to create, edit, delete, and otherwise manage a roster associated with a lesson offering, as described in more detail below.

It should be understood that embodiments described herein refer to students, instructors, and administrators. Depending on the particular embodiment, the functionality described, including the user interfaces may be provided to any of these classes of users. As an example, while a user interface may be described as an administrator user interface, some embodiments may be configured to provide the same user interface (and/or similar data) to a student and/or instructor. Similarly, while examples described herein may refer to a student or user, depending on the particular embodiment, the student may be a minor or otherwise may have a guardian, agent, or other person who acts behalf of the student. In some embodiments, the instructor may be the same person as the administrator. As an example, these embodiments may provide for small operations to handle both administration and instruction described herein. Some embodiments may have separate persons operate as an instructor and an administrator.

Figure 2:
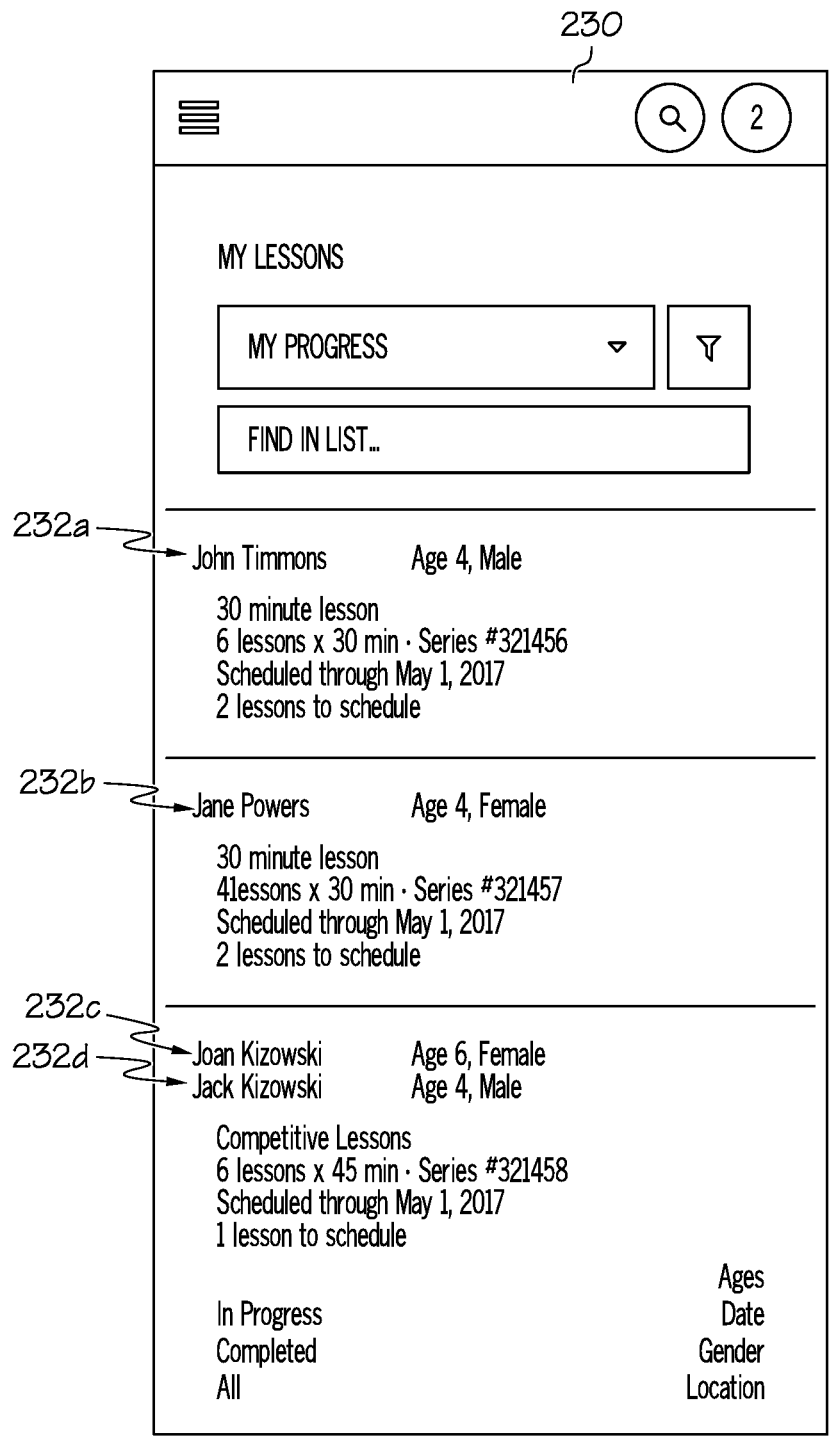
FIG. 2 depicts an administrator user interface for listing events, such as lessons for an instructor, according to embodiments described herein.

FIG. 2 depicts an administrator user interface 230 for listing events, such as lessons for an instructor, according to embodiments described herein. As illustrated in FIG. 2, the user interface 230 may be provided to an administrator and provides information related to lessons that have been scheduled for a particular instructor. Specifically illustrated are lessons for John Timmons, Jane Powers, Jack Kizowski, and Joan Kizowski. Also provided is information regarding the lessons, such as lesson series, date scheduled, location of lesson age of student, gender of student, and/or other information. Options 232a, 232b, 232c, and 232d may also be provided for providing additional information regarding the selected student.

As discussed in more detail below, some embodiments may be configured to provide one or more options for a user to manual sign-up for one or more lessons. However, some embodiments may be configured to predict an event roster based on data regarding the user, the location of the instructor, the location of a student, and/or other data. As an example, the roster may be predicted based on available training facilities and the students and instructors who are in the vicinity (or will be in the vicinity) of the available training facilities. Accordingly, these embodiments may predict a roster, such that the appropriate training facility may be selected and/or reserved. Some embodiments may send a notification to a desired instructor based on the predicted roster. Similarly, some embodiments may send a notification to the students who have been identified in the predicted roster with information regarding the offering. Some of these embodiments may provide discounts and/or other incentives for agreeing to participate in the event.

Figure 3:
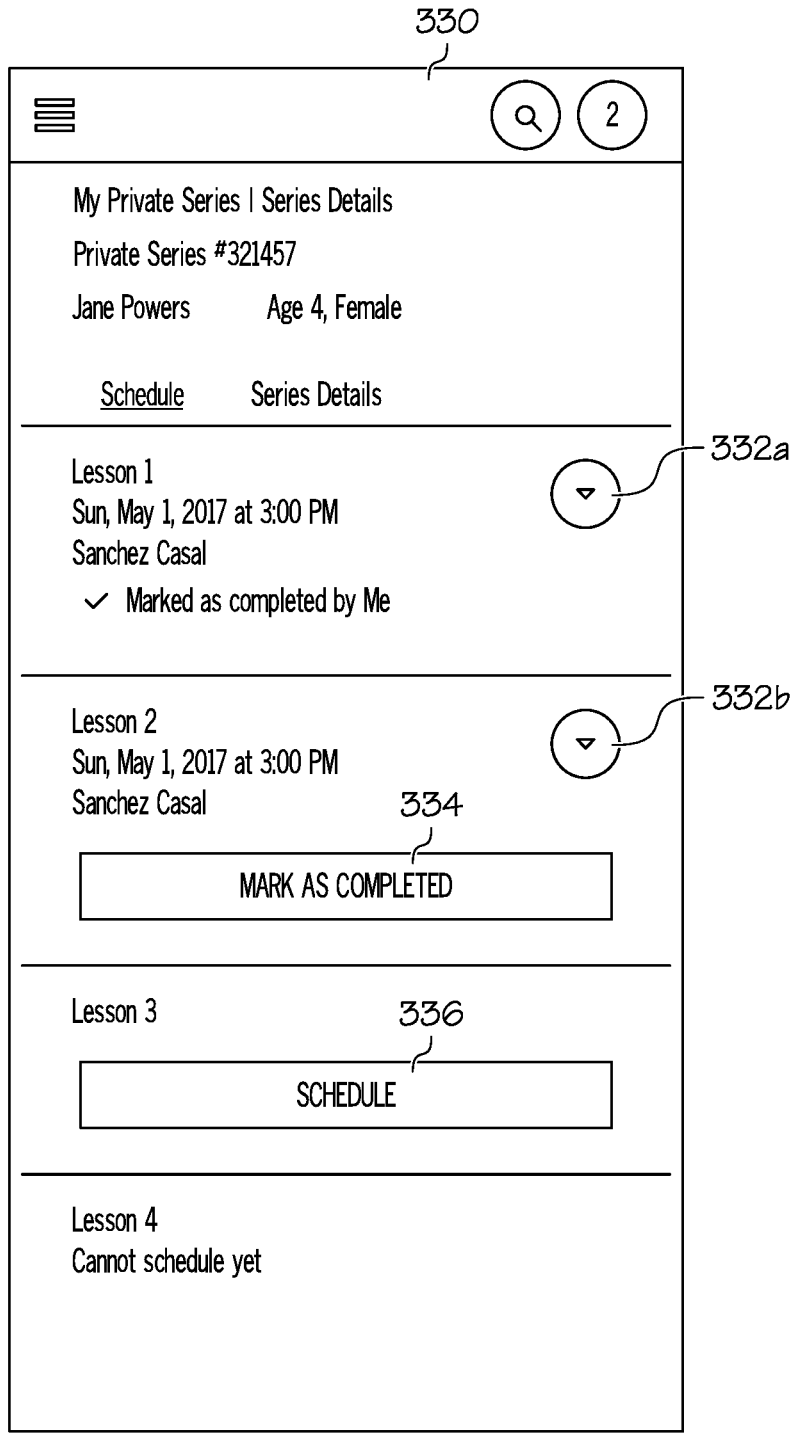
FIG. 3 depicts an administrator user interface for providing private series lessons for a student, according to embodiments described herein.

FIG. 3 depicts an administrator user interface 330 for providing private series lessons for a student a, according to embodiments described herein. In response to selection of the option 232b from FIG. 2, the administrator user interface 330 may be provided. The administrator user interface 330 may include a schedule for the private series lessons, where lesson 1 has been scheduled and marked as completed. Lesson 2 has been scheduled, but has not yet been marked as completed. Lesson 3 and lesson 4 have not yet been scheduled. Also provided are options 332a, 332b, which, when selected, provide additional details regarding the respective lesson. An option 334 may also be provided for the administrator to mark the lesson as completed. In embodiments where the administrator is the instructor, the instructor may complete the lesson and immediately select the option 334. In embodiments where the administrator is different than the instructor, the instructor may inform the administrator that the lesson has been completed and the administrator may select the option 334. Also provided is a series details option 336. In response to selection of the series details option 336, additional information regarding the lesson series may be provided.

Figure 4:
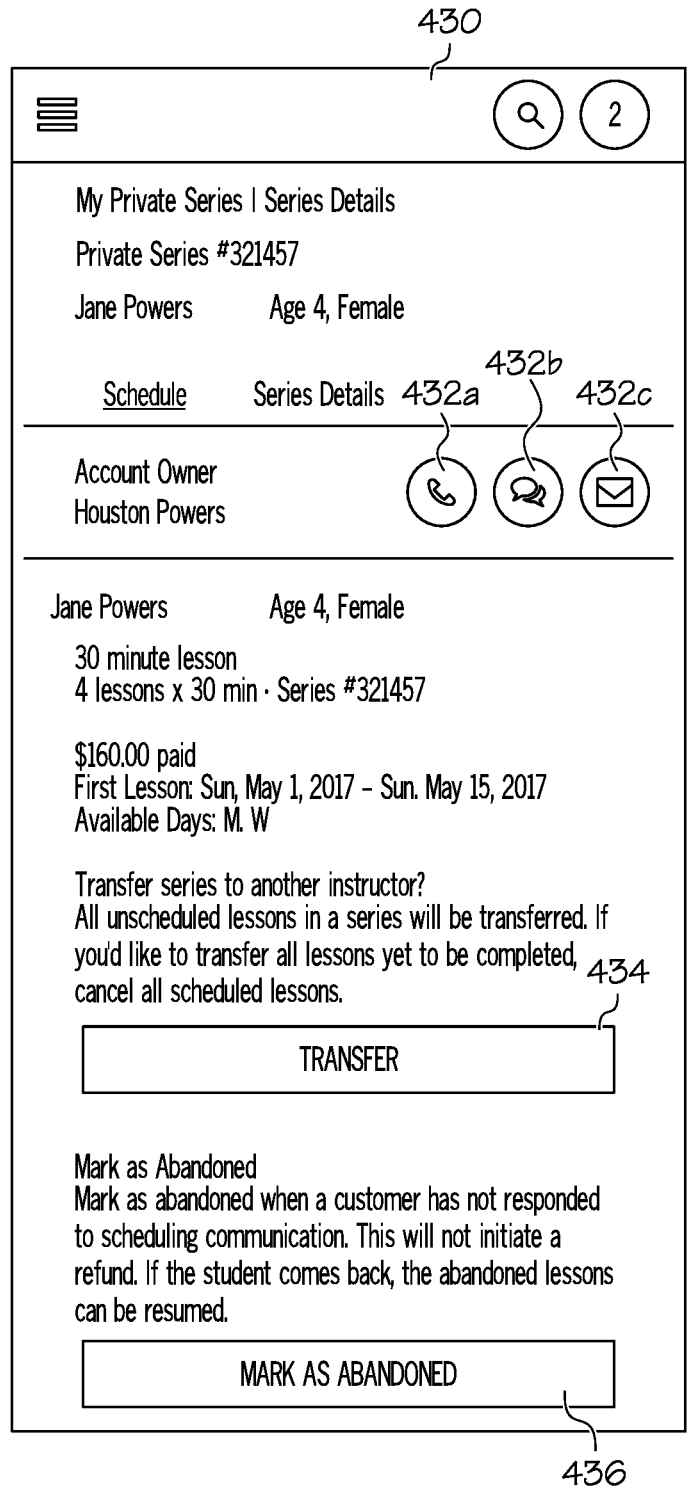
FIG. 4 depicts an administrator user interface for providing transfer options associated with private series lessons, according to embodiments described herein.

FIG. 4 depicts an administrator user interface 430 for providing transfer options associated with private series lessons, according to embodiments described herein. As illustrated, the administrator user interface 430 is provided in response to selection of the series details option 336 from FIG. 3. In this embodiment, the account owner is Houston Powers. Options 432a, 432b, 432c may be selected to contact the account owner, each using a different protocol, such as phone, text message, and/or email. Also provided are details, such as student name, lesson duration, number of lessons, amount paid, lesson times, and/or other information. A transfer option 434 is also provided for the administrator to transfer the lesson series from the provided instructor to another instructor. As an example, if an instructor indicates that he/she is ill, the instructor may be replaced. In some embodiments, the remote computing device 104 may receive negative feedback regarding an instructor and, based on that negative feedback, may determine that that instructor is not fit to instruct the student again. The remote computing device 104 may thus determine a new instructor that better fits the preferences of the student and/or user. In some embodiments, the user may be notified and a request for permission to change instructors may be sent. In some embodiments, the instructor replacement may be made automatically. An abandon option 436 is also provided for abandoning the lesson series, such as if the student and/or user has not responded, not paid a past due invoice, and/or for other reasons.

Figure 5:
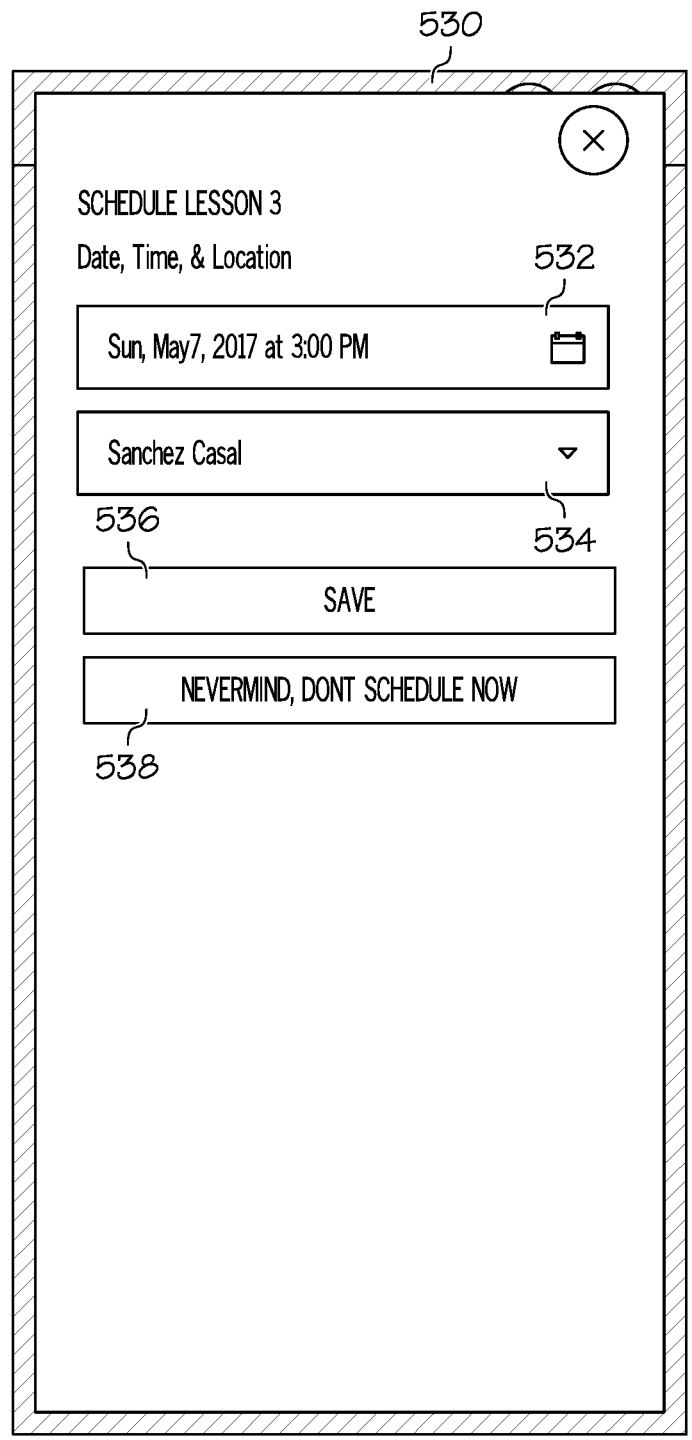
FIG. 5 depicts an administrator user interface for scheduling a lesson with a student, according to embodiments described herein.

FIG. 5 depicts an administrator user interface 530 for scheduling a lesson with a student, according to embodiments described herein. As illustrated, the administrator user interface 530 may include options for scheduling a new lesson. Accordingly, the administrator user interface 530 includes an option 532 for selecting the date, time, and location of the lesson. A name option 534 may be provided for the administrator to enter the student name for the lesson. A save option 536 is also provided, as well as a cancel option 538.

Figure 6:
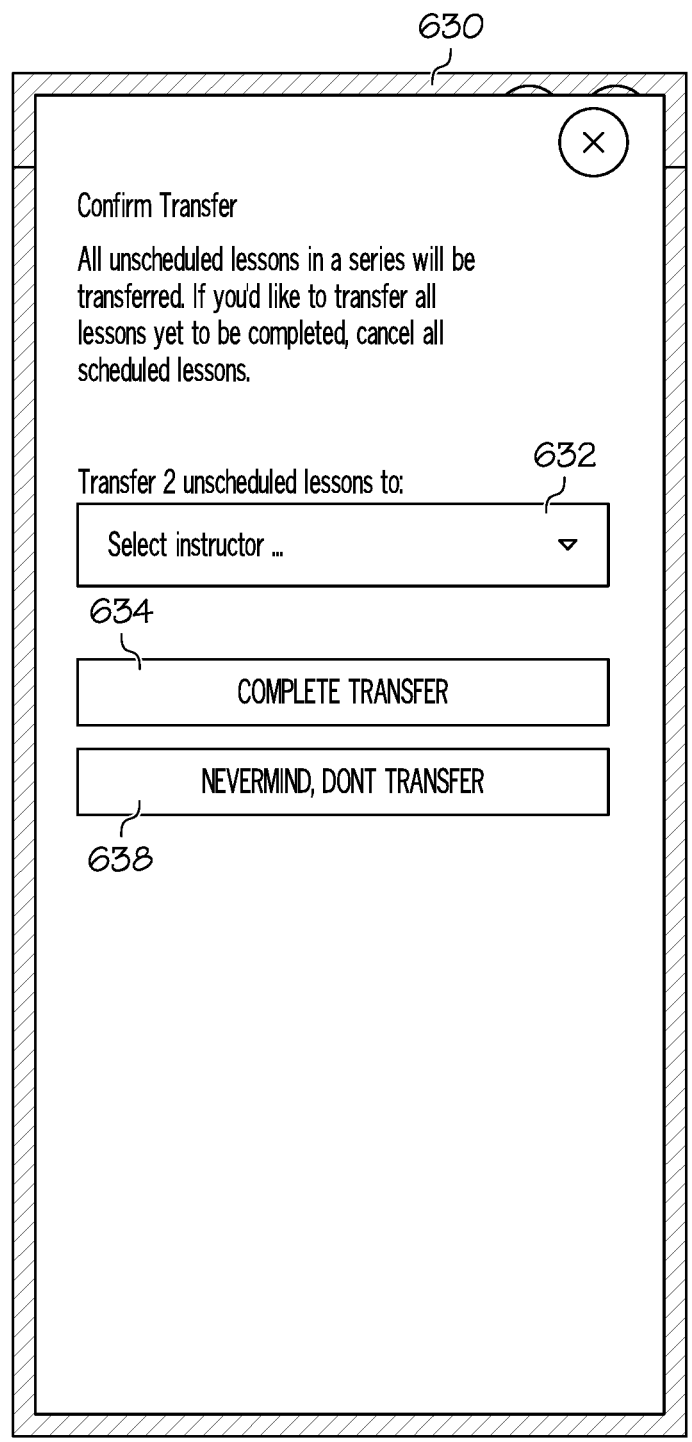
FIG. 6 depicts an administrator user interface to transfer a lesson and/or student to another instructor, according to embodiments described herein.

FIG. 6 depicts an administrator user interface 630 to transfer a lesson and/or student to another instructor, according to embodiments described herein. As illustrated, a lesson may be transferred from a first instructor to a second instructor for any of a plurality of reasons, such as an instructor request, a student and/or user request, a facility change, etc. As an example, the transfer may be implemented by the administrator in situations where the originally assigned instructor is no longer available. In some embodiments, the transfer may result from a request from the student or user. Some embodiments may be configured to provide an interface for the user to directly make the transfer request.

Regardless, the administrator user interface 630 includes an instructor option 632 for selecting an instructor that will receive the transferred lesson. A complete transfer option 634 is also provided for completing the transfer. A cancel option 638 is also provided for canceling the transfer.

Figure 7:
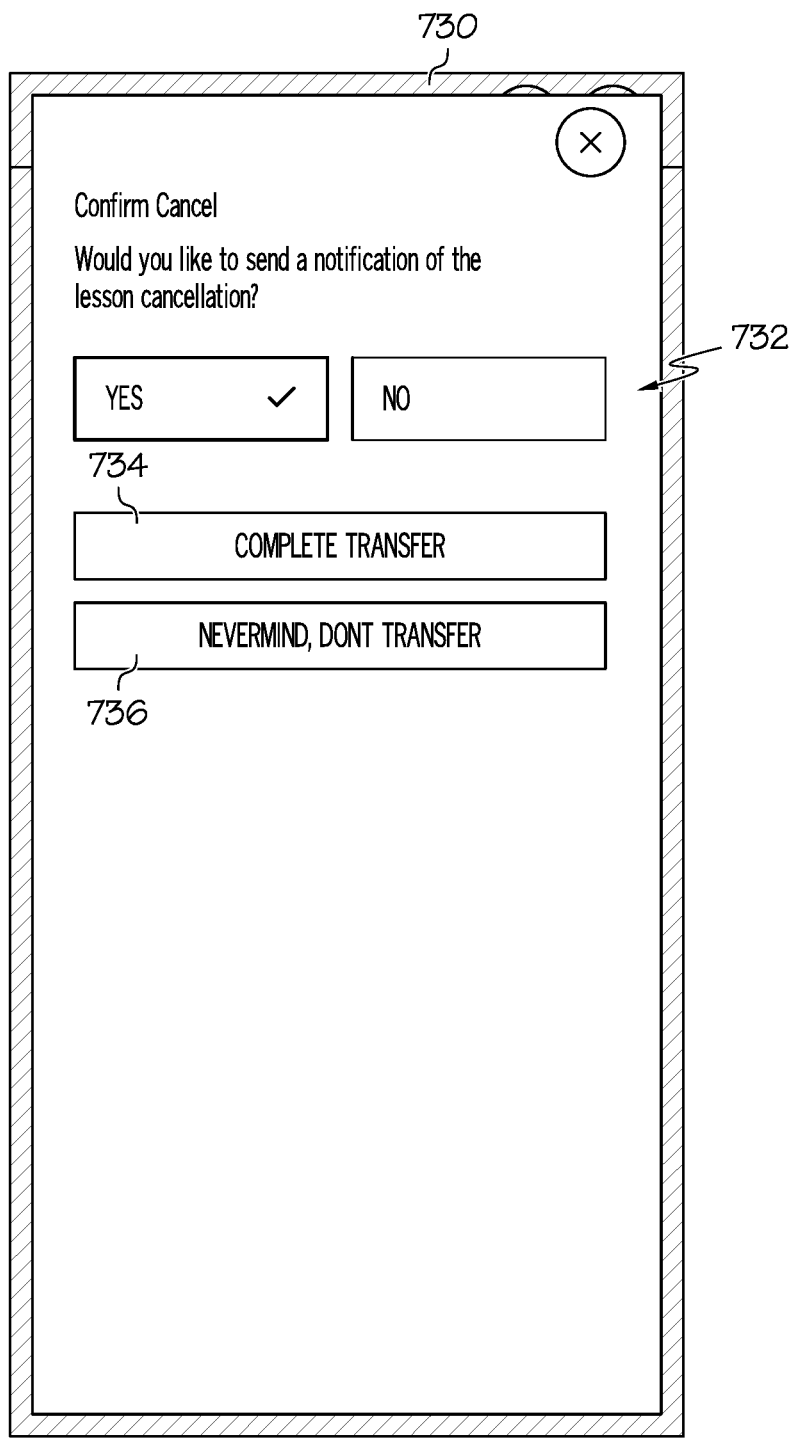
FIG. 7 depicts an administrator user interface for cancelling a lesson with a student, according to embodiments described herein.

FIG. 7 depicts an administrator user interface 730 for canceling a lesson with a student, according to embodiments described herein. As illustrated, the administrator user interface 730 includes a cancel option 732 for a user to indicate whether to cancel a lesson. A confirm option 734 is also provided, as well as a keep lesson option 736.

Figure 8:
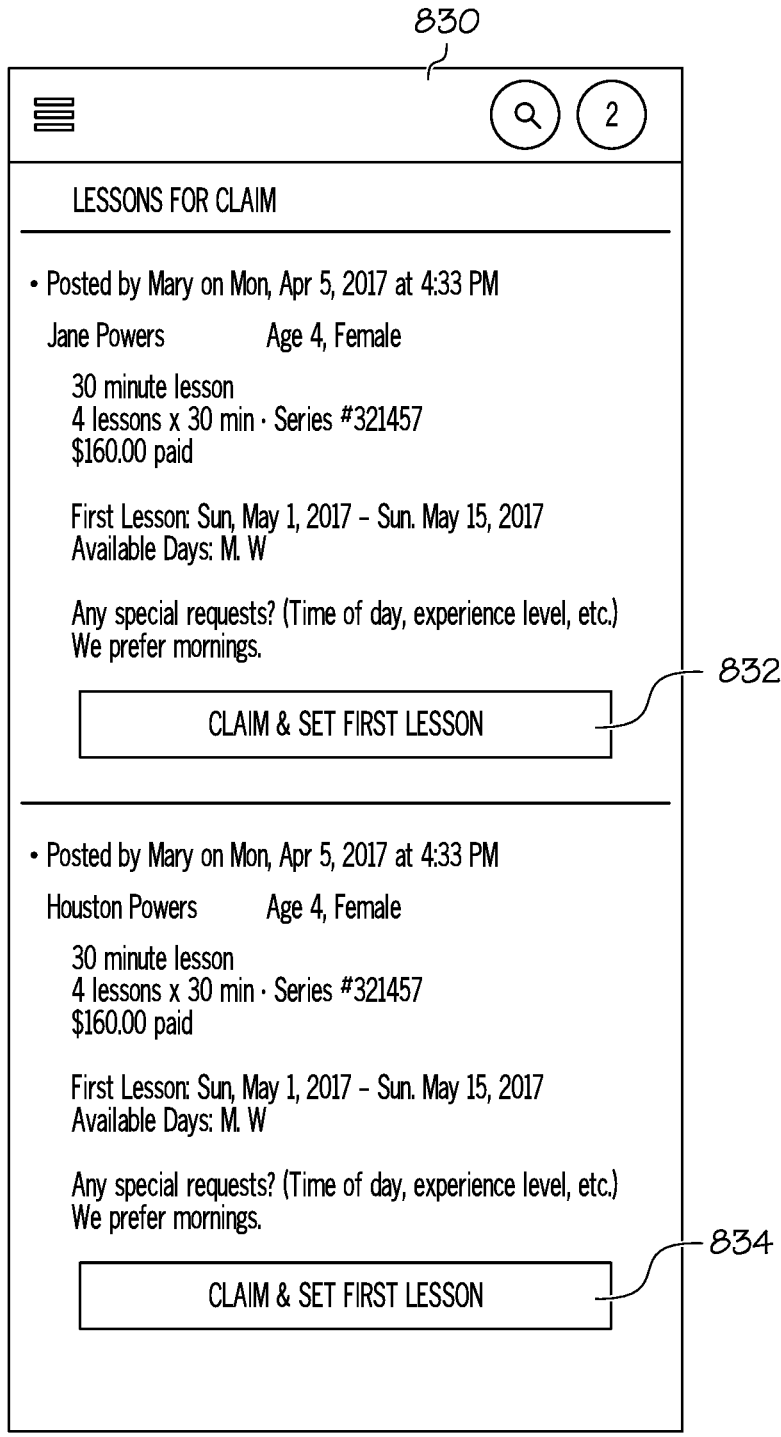
FIG. 8 depicts an administrator user interface for claiming a lesson with a student, according to embodiments described herein.

FIG. 8 depicts an administrator user interface 830 for claiming a lesson with a student, according to embodiments described herein. As an example, some embodiments may be configured such that a lesson offering is provided. The lesson offering may be a private lesson, a semi-private lesson, and/or a group lesson. Regardless, these embodiments may post the lesson offering(s) may be posted to one or more users, who may claim the lesson offerings. Similarly, depending on the embodiment, the lesson offerings may be provided to one or more instructors, who may also claim the lesson offerings. In some embodiments, the students may be provided with the lesson offering prior to the instructor being set, while other embodiments set the instructor prior to the students being provided with the lesson offering. Similarly, some embodiments may set the training facility before the instructor and/or student are set and/or after the instructor and/or student are set.

Referring again to FIG. 8, the administrator user interface 830 provides two different lesson series purchased by a single user for her children. The first lesson series was purchased for Jane Powers and the second was purchased for Houston Powers. The administrator user interface 830 also provides options 832a, 832b for claiming and setting the first lesson. Specifically, in response to a user claiming the lesson series, embodiments described herein may be configured to predict appropriate times, locations, and/or instructors for the lessons that fit the student schedule. As an example, these embodiments may be configured to understand that Jane will likely be driving the two students to the lessons, so three lessons will ideally be at the same time and in the same location. Jane may have also designated preferred times and/or dates for the lessons.

Similarly, the embodiments may access the instructors' schedules and/or otherwise determine an instructor that can accommodate the lesson offering. As such, these embodiments may determine an appropriate venue and instructors that can accommodate two simultaneous lessons that also fit Jane's requests. This time and location may then be sent to the user and added to the instructor's calendar. In those embodiments where the system has access to a user calendar, the user calendar may also be accessed and updated.

Figure 9:
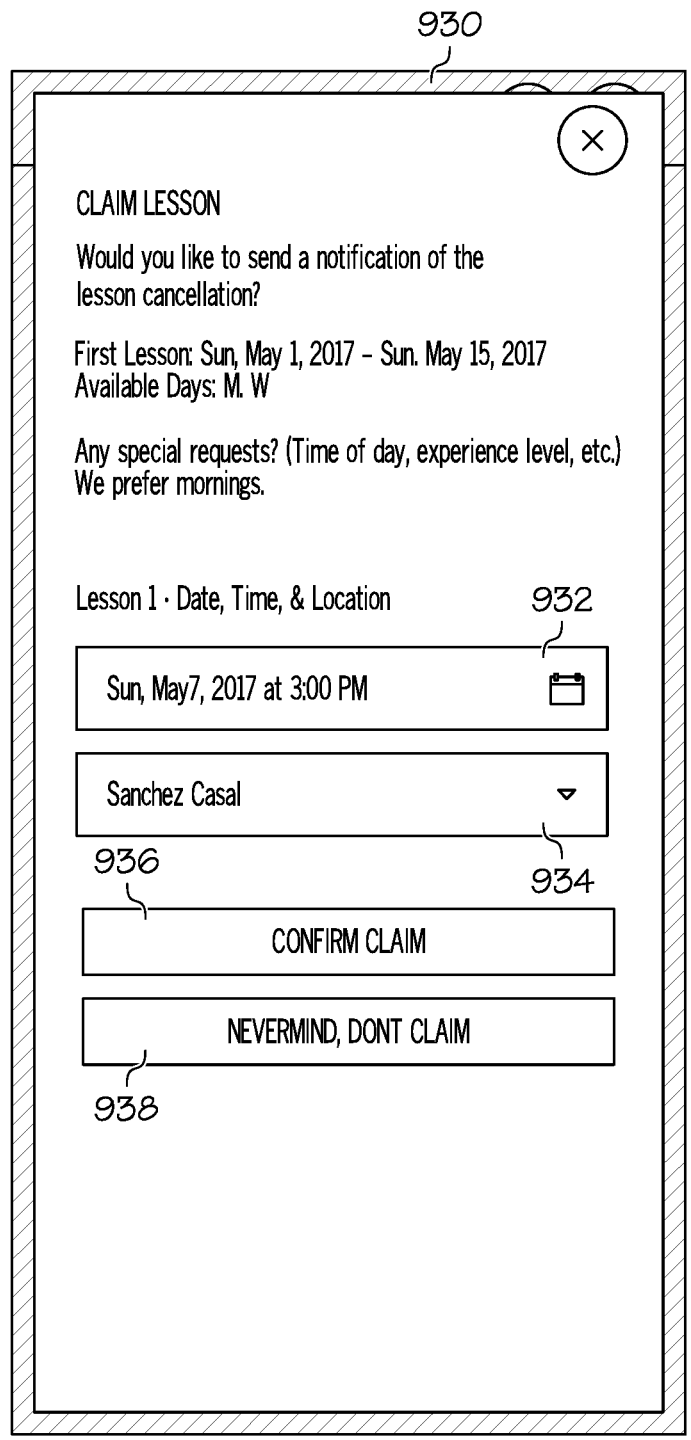
FIG. 9 depicts an administrator user interface for confirming a claimed lesson with a student, according to embodiments described herein.

FIG. 9 depicts an administrator user interface 930 for confirming a claimed lesson with a student, according to embodiments described herein. In response to selection of the option 832 from FIG. 8, the administrator user interface 930 may be provided. As illustrated, the administrator user interface 930 may include a lesson characteristic 932, such as date, time, location, current rosters, etc. As described above, these lesson characteristics may be determined by the remote computing device 104 and provided as a default option to the user in the administrator user interface 930, with the ability to change the default designation. Also provided is an instructor option 934. Again, while the embodiment of FIG. 9 may provide the administrator with the ability to select the instruction, some embodiments may be configured such that the instructor is determined (and/or defaulted) by the remote computing device 104, based on the availability of the instructor at the designated venue and time. Once the information is set as desired, the administrator may select a confirm claim option 936. If not, a cancel option 938 may be selected.

It should be understood that, while the administrator user interface 930 may be provided to an administrator who is not an instructor, user, student; this is one example. Some embodiments may be configured to provide the administrator user interface 930 to the instructor, the user (such as Jane Powers), and/or to a particular user or student. While the students in the examples of FIGS. 8 and 9 are small children, some embodiments may be directed for older students, such that a college coach (who would be the user) may designate the lessons for members of his/her team, and each student/team member may claim those lessons, as appropriate.

FIG. 10A depicts a user interface 1030a for providing pending lessons for the student, according to embodiments described herein. As illustrated in FIG. 10A, the user interface 1030a provides an option 1032 for selecting the status of the lesson being provided. As an example, in FIG. 10A, the option 1032 is selected as "pending," so the information provided includes pending lessons for a particular instructor (and/or facility, user, administrator, etc.). Also provided in the user interface 1030a are manage options 1034a, 1036a, for allowing the user to alter one or more characteristics of the lesson or lesson series.

FIG. 10B depicts an instructor user interface 1030b for providing in progress lessons with an instructor, according to embodiments described herein. As illustrated, the option 1032 is selected for those lessons that are in progress. Included in the instructor user interface 1030b are a manage series option 1034b and a schedule option 1036b. In response to selection of the manage series option 1034b, the user may be provided with additional options related to preferred instructors, venues, times, dates, etc. In response to selection of the schedule option 1036b, additional options for scheduling one or more lessons from the selected lesson series.

Figure 10D:
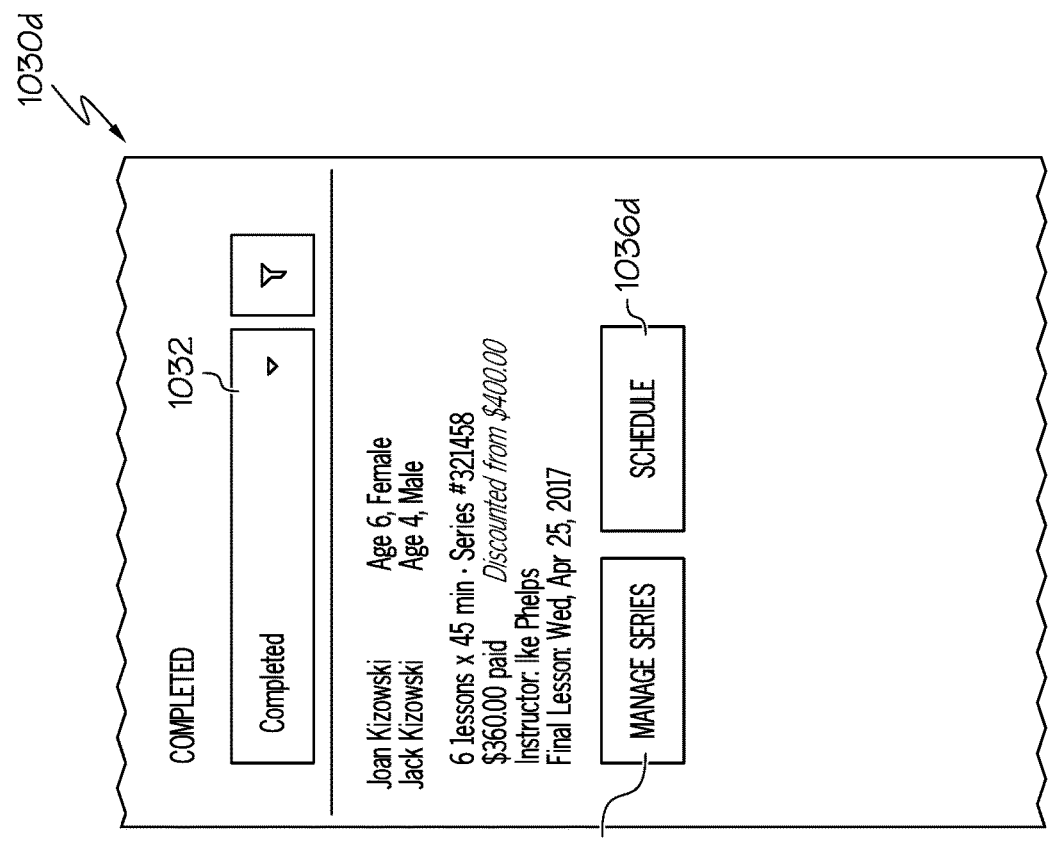
FIG. 10D depicts an instructor user interface for providing completed lessons, according to embodiments described herein.
Figure 10C:
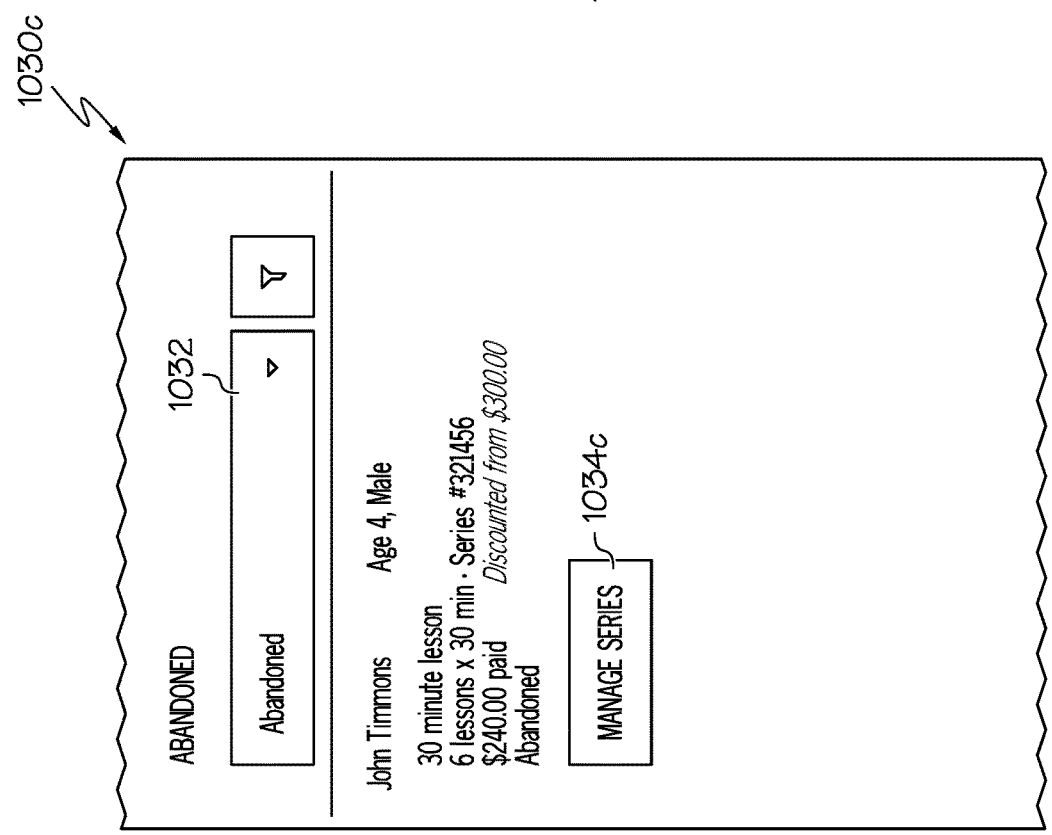
FIG. 10C depicts an instructor user interface for providing abandoned lessons, according to embodiments described herein.

FIG. 10C depicts an instructor user interface 1030c for providing abandoned lessons, according to embodiments described herein. As illustrated, the instructor user interface 1030c depicts abandoned lessons and/or lesson series. Additionally, a manage series option 1034c is provided for reinstating the lesson and/or lesson series or for taking other actions.

FIG. 10D depicts an instructor user interface 1030d for providing completed lessons, according to embodiments described herein. As illustrated, the instructor user interface 1030d may provide completed lessons and/or lesson series. Accordingly, a manage series option 1034d and a schedule option 1036d may be provided for managing and/or scheduling additional lessons or lesson series.

It should be noted that additional options may also be provided, including options to view all offerings, group offerings, private offerings, and archived offerings. Additional options for showing lessons based on programs, ages, date, instructors, location, and type may also be provided.

Figure 11A:
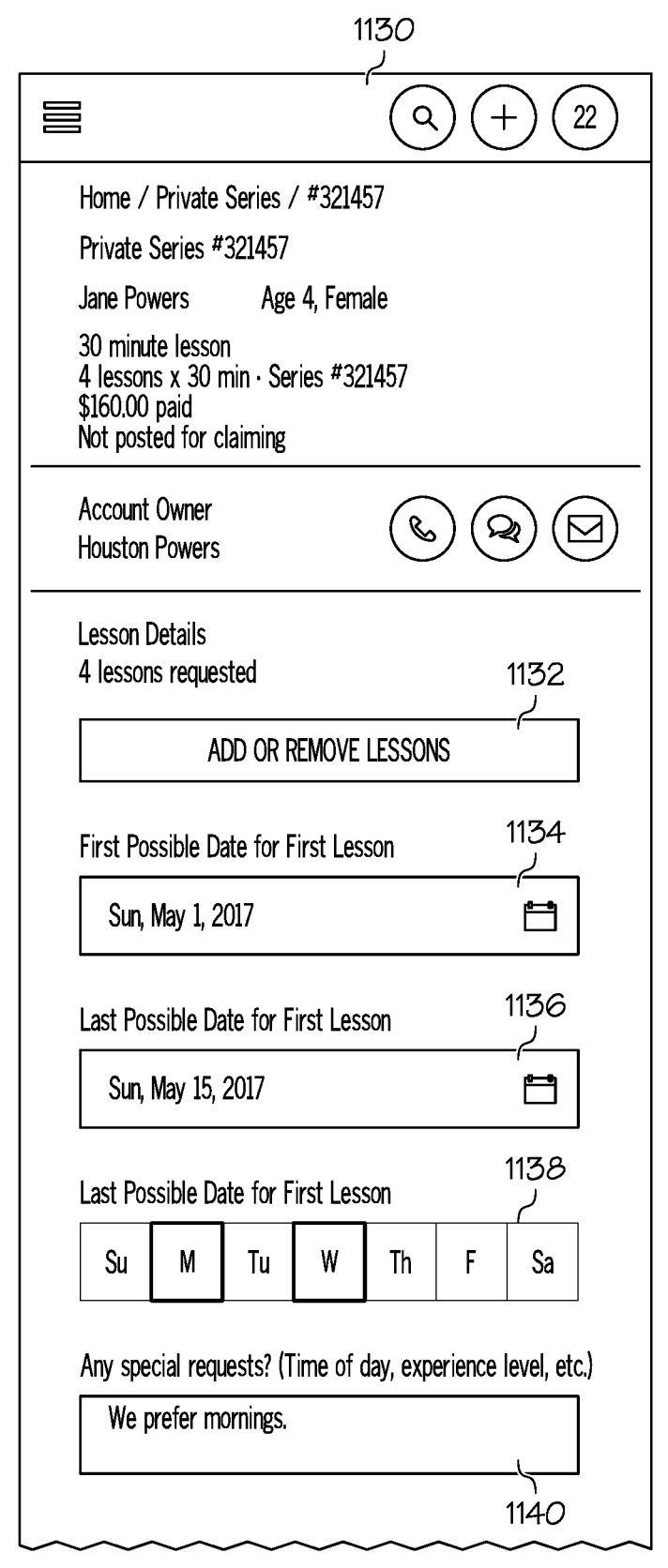
Figure 11B:
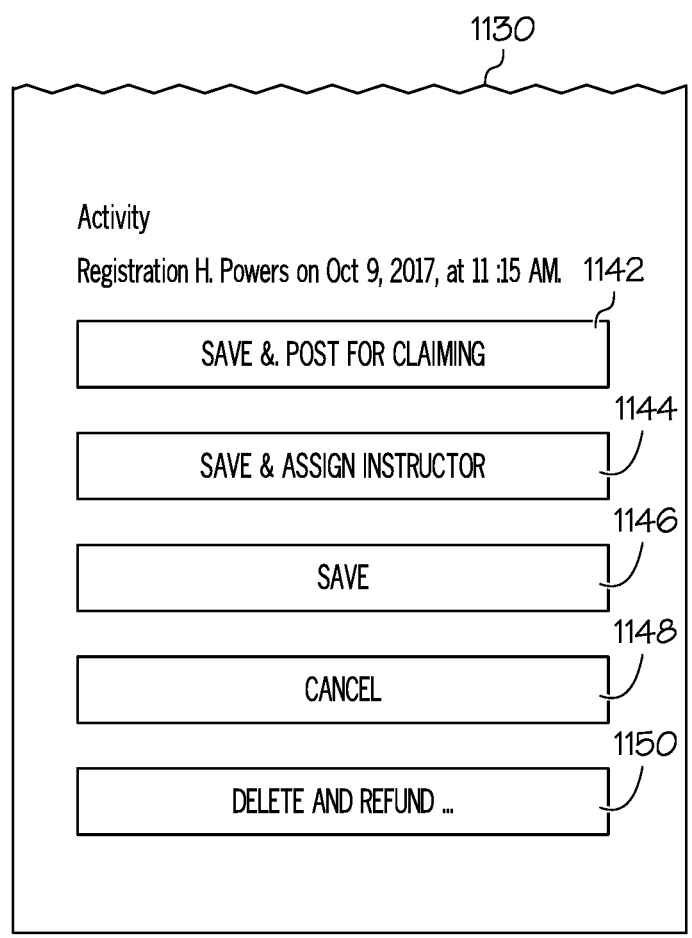

FIGS. 11A, 11B depict a student user interface 1130 for providing a user with details regarding lessons for a student, according to embodiments described herein. As illustrated, the student user interface 1130 provides a student and/or other user with information about a lesson. In the example of FIG. 11A, the account owner is Houston Powers, but the lessons are for Jane powers. Also provided is a lessons option 1132, which may provide options for adding lessons from the lesson series, removing lessons from the lesson series, purchasing additional lessons, and/or performing other similar actions. Options 1134, 1136, 1138, and 1140 provide the user with the ability to designate the preferred date, time, days, and other characteristics for a lesson.

As illustrated in FIG. 11B, also provided are a save and post option 1142, a save and assign option 1144, a save option 1146, a cancel option 1148, and a delete and refund option 1150. In response to selection of the save and post option 1142, the lesson characteristics may be saved and posted for an instructor or administrator to claim the lesson. In response to selection of the save and assign option 1144, the lesson characteristics may be saved and the remote computing device 104 may automatically assign the lesson (or lesson series) to an instructor based on a determination by the remote computing device 104 regarding availability, convenience to the venue, for both the instructor and account owner. In response to selection of the save option 1146, the lesson characteristics may be saved for later retrieval by the user. In response to selection of the delete option 1152, the lesson and/or lesson series may be deleted and a refund will be requested from the administrator.

Figure 12:
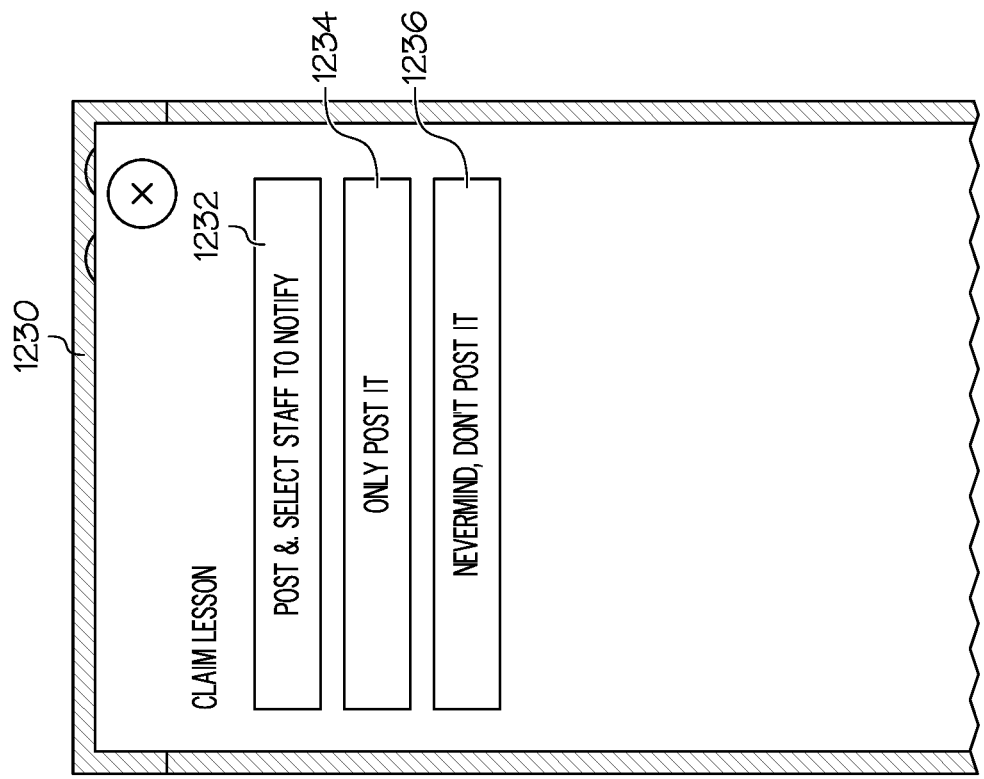
FIG. 12 depicts an administrator user interface to post a lesson for claiming, according to embodiments described herein.

FIG. 12 depicts an administrator user interface 1230 to post a lesson for claiming, according to embodiments described herein. As illustrated, the administrator user interface 1230 provides a user, such as an administrator, with a post and select option 1232, a post option 1234, and a do not post option 1236. In response to selection of the post and select option 1232, the administrator (or other user) may post a lesson (with lesson characteristics) to an instructor portal and notify possible instructors (or other staff) of the posting. In response to selection of the post option 1234, the lesson and lesson characteristics may be posted to an instructor portal, but no notification may be sent. In response to selection of the do not post option 1236, the lesson and/or lesson series may not be posted.

Figure 13:
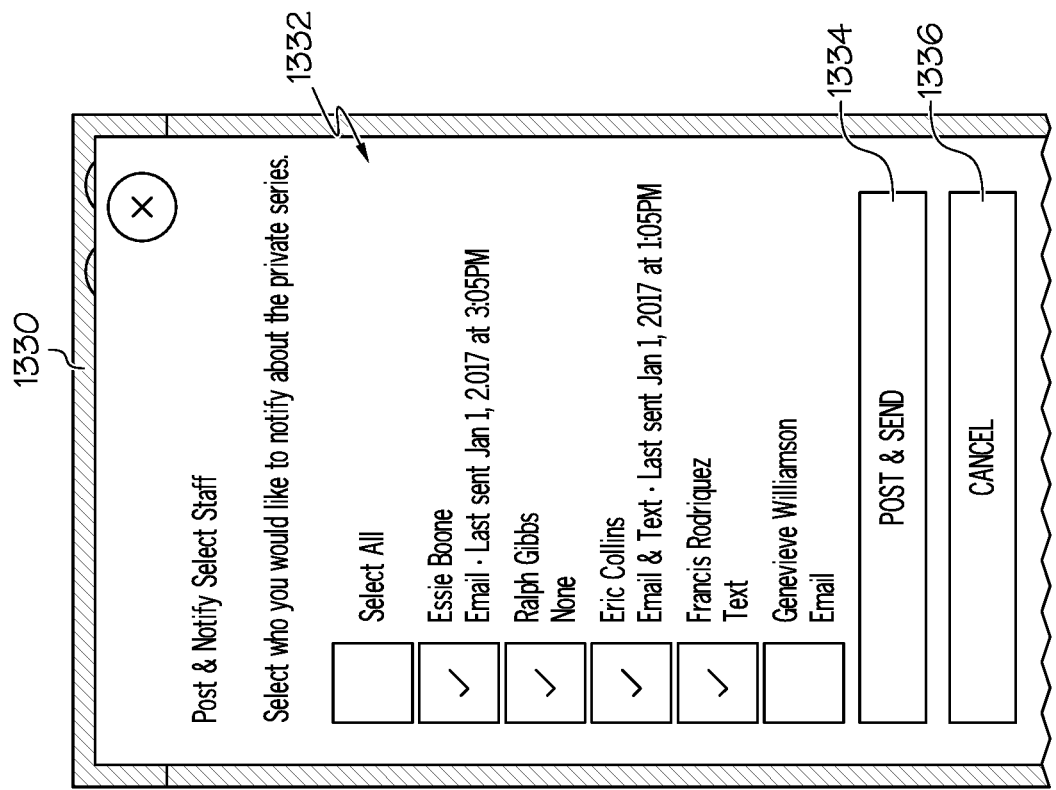
FIG. 13 depicts an administrator user interface for posting a lesson and notifying an instructor of a lesson, according to embodiments described herein.

FIG. 13 depicts an administrator user interface 1330 for posting a lesson and notifying an instructor of a lesson, according to embodiments described herein. In response to selection of the post and select option 1232 from FIG. 12, the administrator user interface 1330 may be provided. As illustrated, the administrator user interface 1330 includes an instructor section 1332, a post option 1334, and a cancel option 1336. The instructor section 1332 provides options for selecting one or more instructors to be notified of the lesson. In response to selecting the desired instructors and selecting the post option 1334, the selected instructors may be notified and the lesson may be posted. In response to selection of the cancel option 1336, the action may be canceled and the user returned to the administrator user interface 1230 from FIG. 12. In some embodiments, a cancellation notification may be provided.

Figure 14:
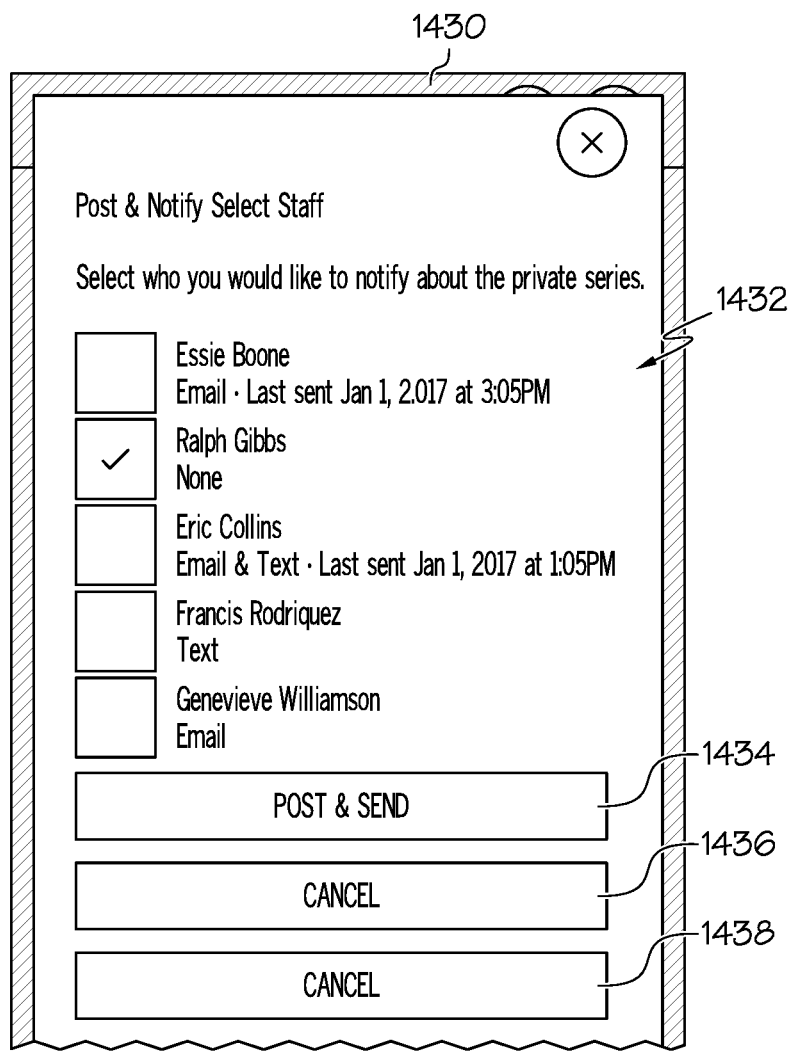
FIG. 14 depicts an administrator user interface for assigning an instructor to a lesson, according to embodiments described herein.

FIG. 14 depicts an administrator user interface 1430 for assigning an instructor to a lesson, according to embodiments described herein. As illustrated, the administrator user interface 1430 may include an instructor section 1432, an assign and notify option 1434, an assign option 1436, and a do not assign option 1436. The instructor section 1432 may provide one or more instructors who have responded as being interested in teaching the lesson (or lesson series), those instructors who the administrator believes should be considered, and/or those instructors the remote computing device 104 identifies as being a preferred candidate for the lesson and/or lesson series. As an example, the remote computing device 104 may determine that a particular instructor has the availability, the proximity, and the expertise to teach a predetermined lesson or lesson series. As such, the remote computing device 104 may provide that one or more instructor for selection.

The administrator may then select one or more of the listed instructors. In response to selection of the one or more instructors and in response to selection of the assign and notify option 1434, the selected instructor(s) may be assigned and notified of the assignment. The notification may be provided via email, text message, telephone call, calendar entry, and/or via other mechanisms. In response to selection of one or more instructors in the instructor section 1432 and selection of the assign option 1436, the selected instructor(s) may be assigned, but no notification will be provided. In response to selection of the do not assign option 1438, the assignment process may be canceled and the user may be directed to the administrator user interface 1230 from FIG. 12.

Figure 15:
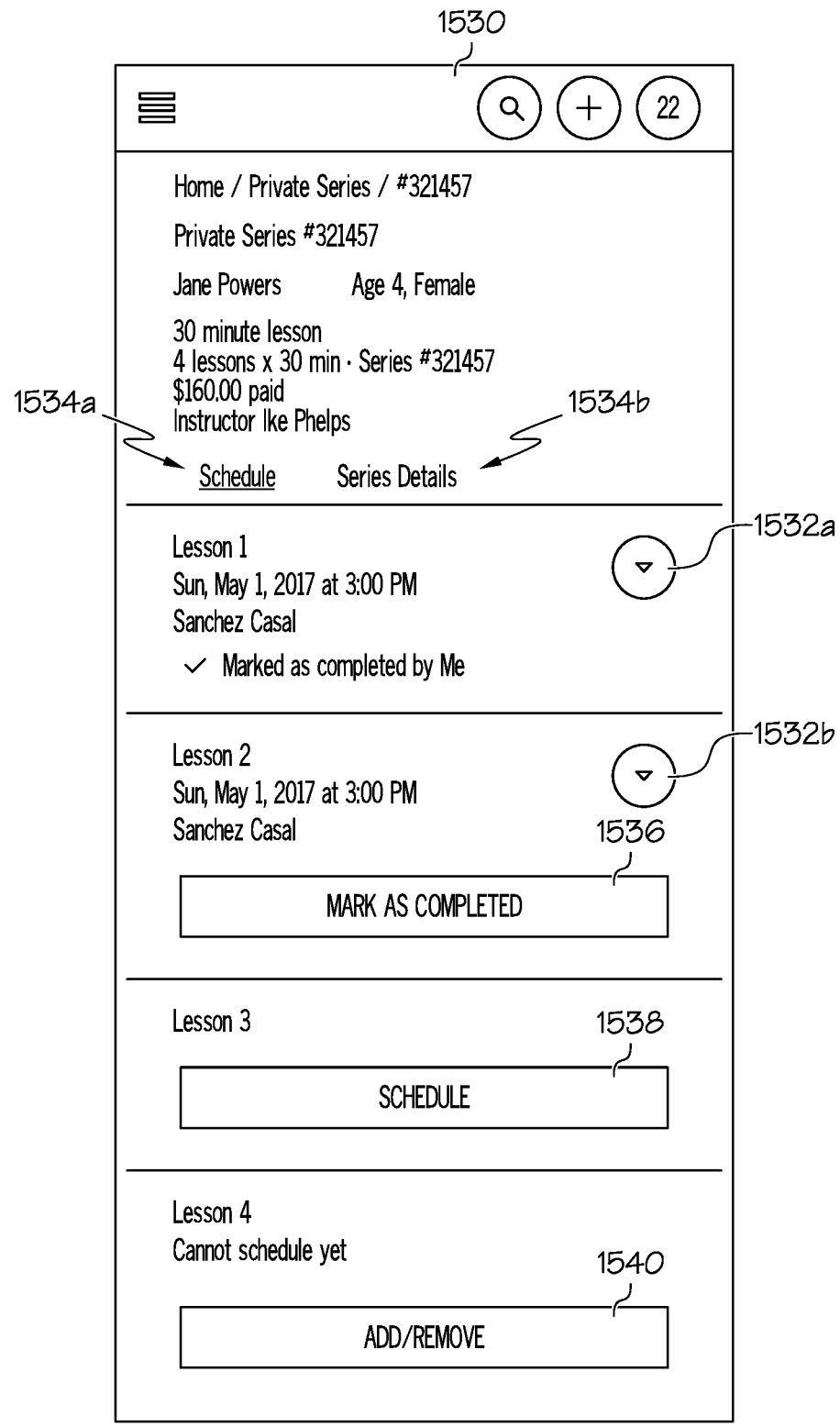
FIG. 15 depicts a user interface for completing a lesson, according to embodiments described herein.

FIG. 15 depicts a user interface 1530 for completing a lesson, according to embodiments described herein. As illustrated, the user interface 1530 may provide information related to a lesson, or group of lessons. In response to selection of a schedule option 1534a, one or more lessons may be provided, along with the associated scheduling characteristics. An option 1532a, 1532b may also be provided for providing additional details regarding the listed lessons. In response to selection of a series details option 1534b, additional details regarding all of the lessons may be provided.

Additionally, the user interface 1530 may provide a completed option 1536, a schedule option 1538, and an add or remove option 1540. In response to selection of the completed option 1536, the user (who in this example is the student and/or account owner) may identify that Lesson 1 has been completed. As discussed above, this may be confirmed by the instructor. In response to selection of the schedule option 1538, the next lesson in the series may be scheduled by the user. In response to the add or remove lessons, additional lessons may be added to the series and/or lessons may be removed.

Figure 16A:
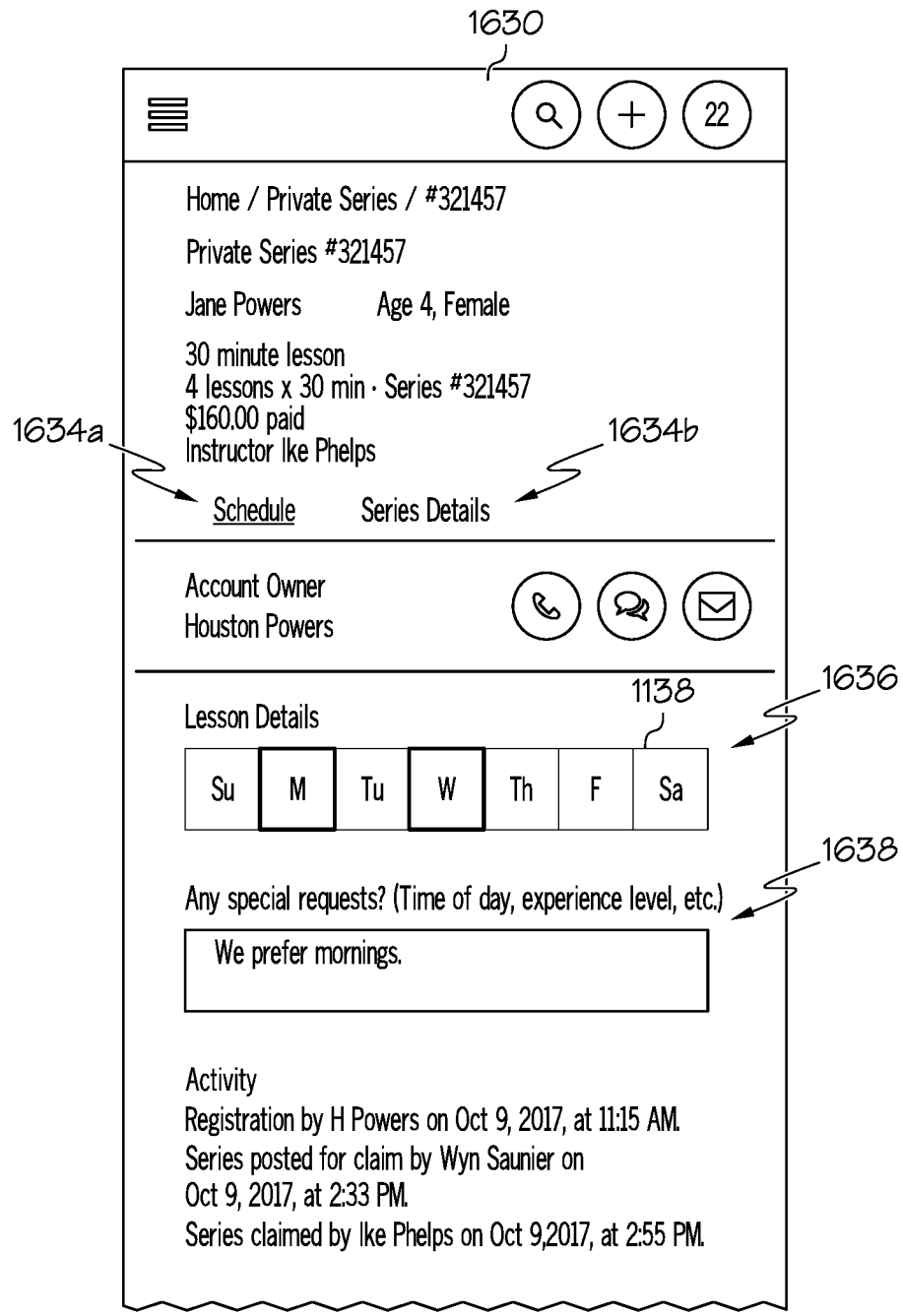
FIGS. 16A, 16B depicts a user interface for providing details associated with a lesson, according to embodiments described herein.
Figure 16B:
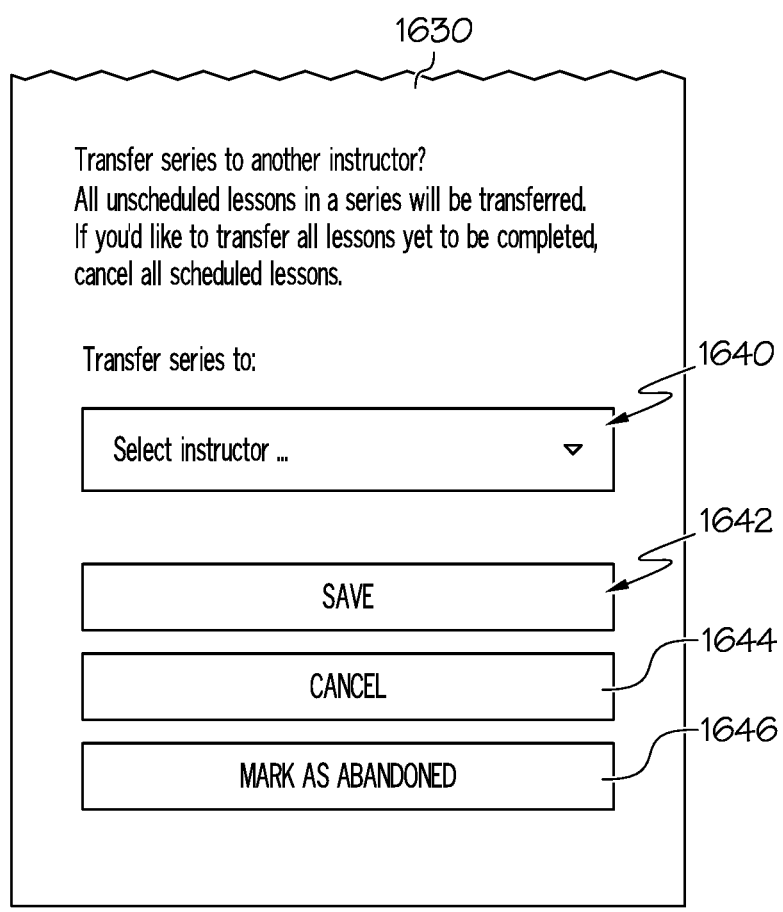

FIGS. 16A, 16B depict a user interface 1630 for providing details associated with a lesson, according to embodiments described herein. As illustrated, the user interface 1630 provides a schedule option 1634a, and a series details option 1634b, similar to the user interface 1530 from FIG. 15. However, while the user interface 1530 provides information in response to selection of the schedule option 1534a, the user interface 1630 provides information in response to selection of the series details option 1634b. As such, options 1636 and 1638 may be provided for the user (e.g., the owner of the account, the student, and/or other user) to identify the preferred days, times, locations, instructors, and/or other lesson characteristics.

As illustrated in FIG. 16B, the user interface 1630 also provides information related to activity on the account, as well as a transfer option 1640, a save option 1642, a cancel option 1644, and an abandon option 1646. In response to selection of the transfer option, the user may identify a different instructor to teach the lessons. In response to selection of the save option 1642, changes made to the user interface 1630 may be saved. In response to selection of the cancel option 1644, changes made in the user interface 1630 may be canceled. In response to selection of the abandon option 1646, the lesson and/or lesson series may be abandoned.

Figure 17:
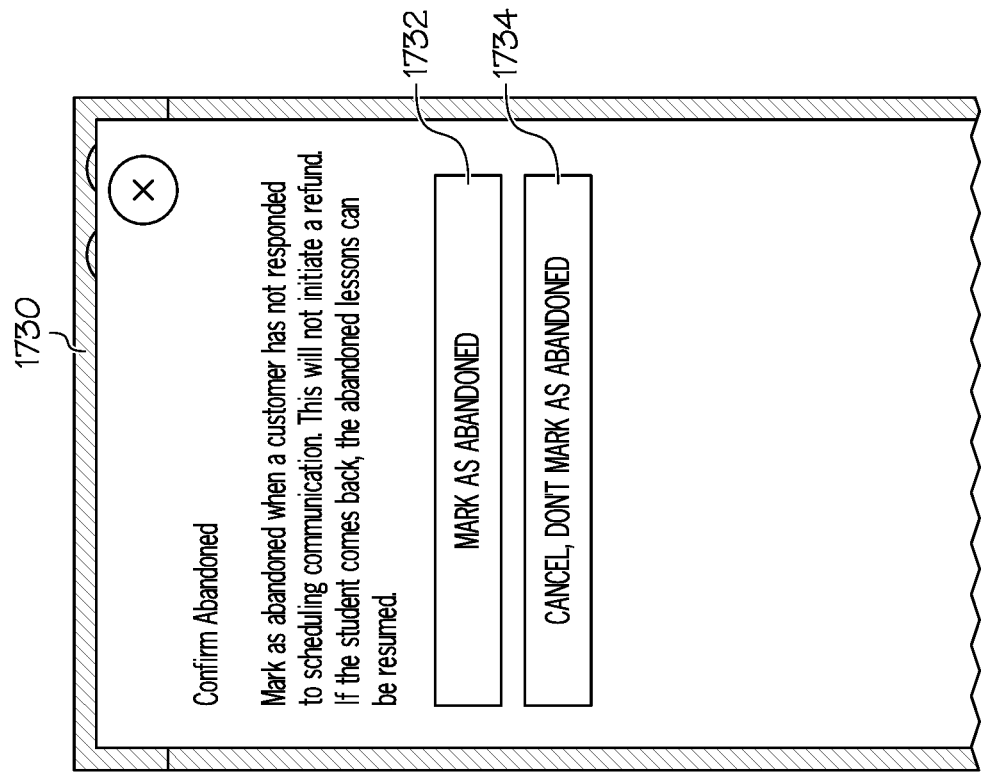
FIG. 17 depicts a user interface for abandoning a lesson, according to embodiments described herein.

FIG. 17 depicts a user interface 1730 for abandoning a lesson, according to embodiments described herein. In response to selection of the abandon option 1646 from FIG. 16B, the user interface 1730 may be provided. As illustrated, the user interface 1730 includes an abandon option 1732 to confirm abandonment of the lesson and/or series. In response to selection of a cancel option 1734, the abandonment may be canceled.

Figure 18:
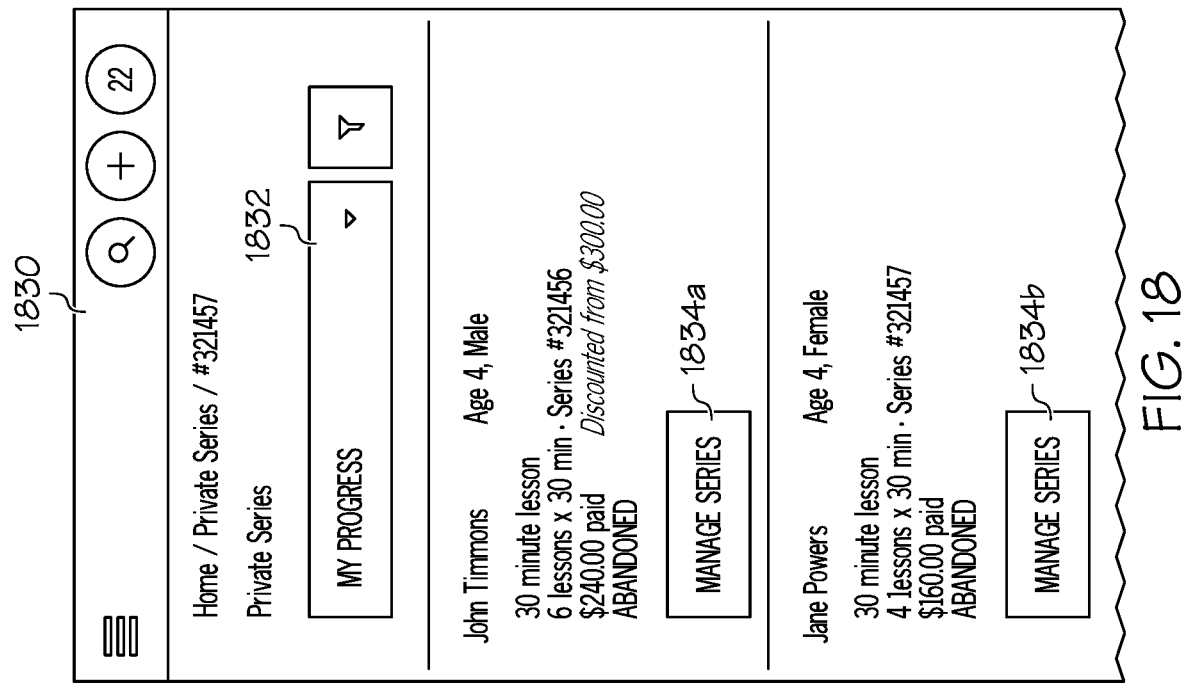
FIG. 18 depicts a user interface for providing abandoned lessons, according to embodiments described herein.

FIG. 18 depicts a user interface 1830 for providing abandoned lessons, according to embodiments described herein. As illustrated, the user interface 1830 provides an option 1832 for a user to view abandoned lessons. In response to selection of the option 1832, the abandoned lessons associated with the user and/or student may be provided. Also provided are manage series options 1834a, 1834b associated with each canceled lesson. In response to selection of the manage series options 1834a, 1834b, additional options and data may be provided, as depicted in FIGS. 19A, 19B.

Figure 19B:
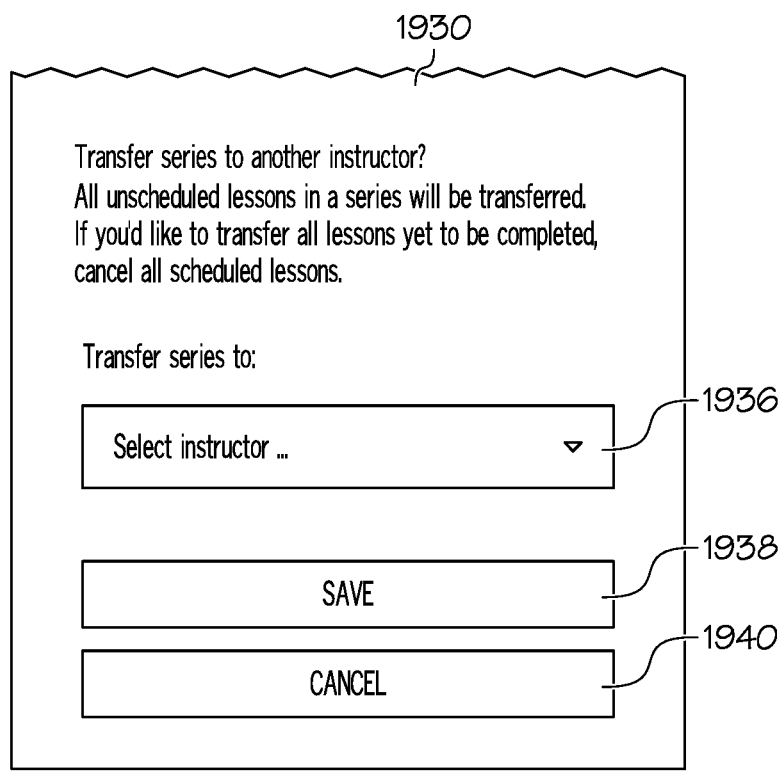

FIGS. 19A, 19B depict an administrator user interface 1930 for providing details of an abandoned lesson, according to embodiments described herein. As illustrated, the administrator user interface 1930 provides details of an abandoned lesson or lesson series. The administrator user interface 1930 includes a schedule option 1932a and a series option 1932b. In response to selection of the schedule option 1932a, the administrator user interface 1930 is provided, with information related to the schedule of the lesson and/or lesson series. In response to selection of the series details, details regarding the overall lesson series may be provided. As an example, days, special requests, activities, and/or other data may be provided.

As illustrated in FIG. 19B, the administrator user interface 1930 also provides an instructor option 1936 for selecting a new instructor (in situations where the lesson and/or lesson series is being revived). A save option 1938 and a cancel option 1940 are also provided.

Figure 20:
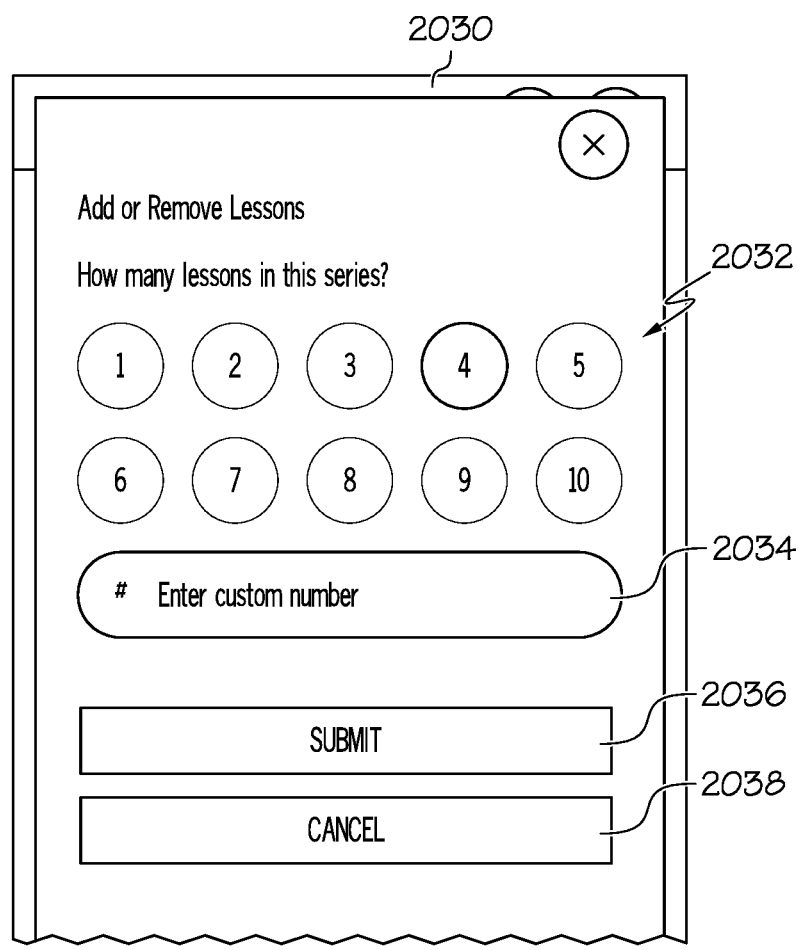
FIG. 20 depicts an administrator user interface for adding and/or removing lessons in a series, according to embodiments described herein.

FIG. 20 depicts an administrator user interface 2030 for adding an add-on event and/or removing lessons in a series, according to embodiments described herein. As illustrated, if a user wishes to add or remove a lesson from a lesson series, the user may select a number from the number section 2032. As illustrated, the current number of lessons in the series may be highlighted. Also provided is a custom option 2034, which may allow the user to enter a custom number of lessons to have in the series. Accordingly, the user can add or remove lessons from the lesson series. A next option 2036 may be provided for proceeding. A cancel option 2038 is also provided.

It should be understood that while removing lessons may cause the user to receive a refund, this is one example. Some embodiments are configured such that a user may be a team coach and removing lessons from one student/team member merely returns those lessons to a lesson pool to be applied to other team members. Other embodiments of tokens or credits are also contemplated.

Figure 21:
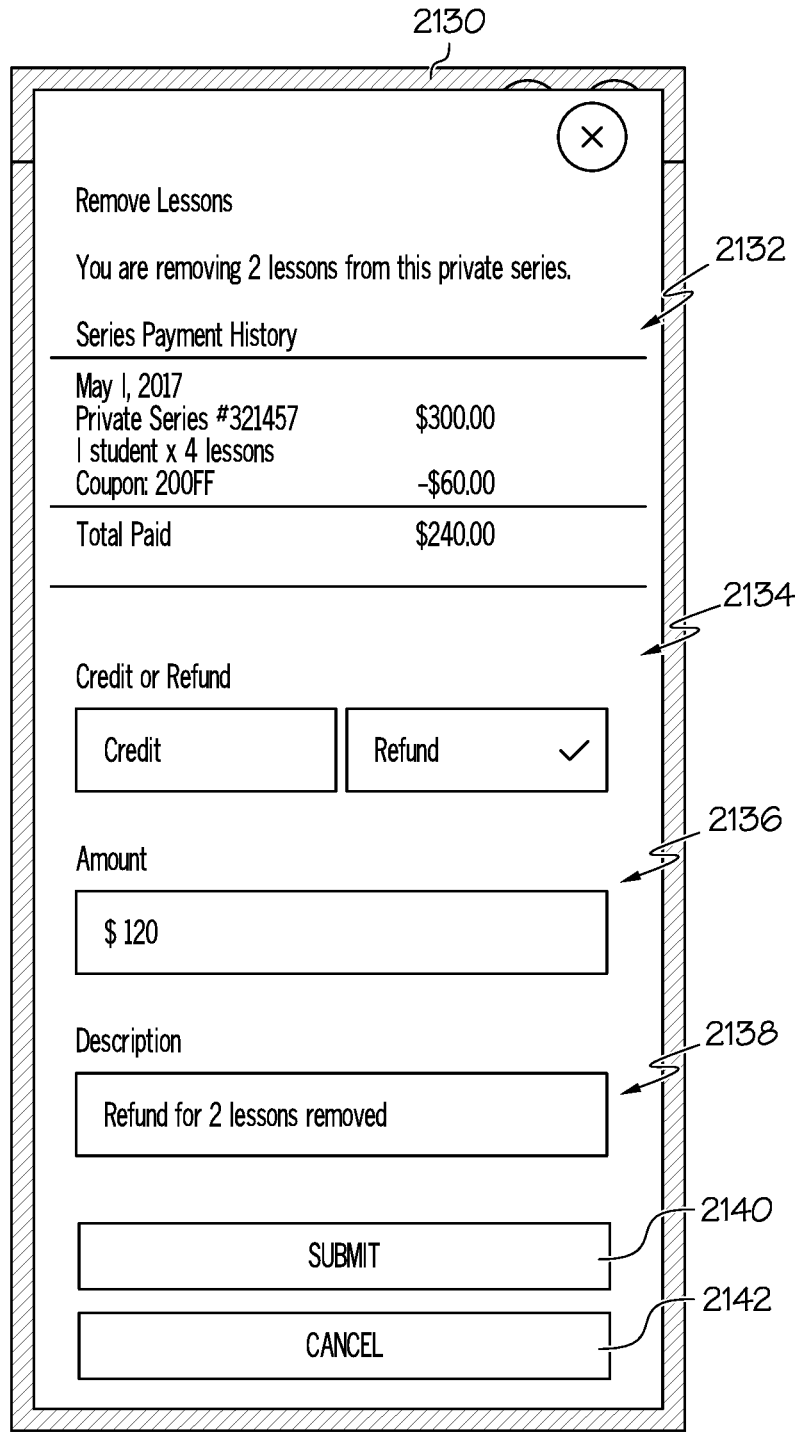
FIG. 21 depicts an administrator user interface for removing a lesson, according to embodiments described herein.

FIG. 21 depicts an administrator user interface 2130 for removing a lesson, according to embodiments described herein. As illustrated, in response to indicating that the user will remove lessons from a lesson series. The administrator user interface 2130 provides a series payment history section 2132, as well as a credit/refund option 2134. Also provided are an amount option 2136, a description option 2138, a submit option 2140, and a cancel option 2142.

As illustrated, the series payment history section 2132 may provide details on the payments made for this lesson series. The credit/refund option 2134 may indicate whether the user wishes to have a credit or a refund for the canceled classes. In some embodiments, the user may have full control over the credit/refund option 2134. However, some embodiments may be configured such that, based on the policies of the particular organization or event, either or both of the credit and refund portions of the credit/refund option 2134 may be disabled.

Similarly, the amount option 2136 may allow the user and/or administrator to indicate the amount of the refund or credit. Again, some embodiments may be automatically populated and disabled from change by the user. The description option 2138 may be provided for an administrator and/or user to provide a reason for the refund/credit, lack of availability of the refund and/or credit, and/or for other purposes.

Figure 22:
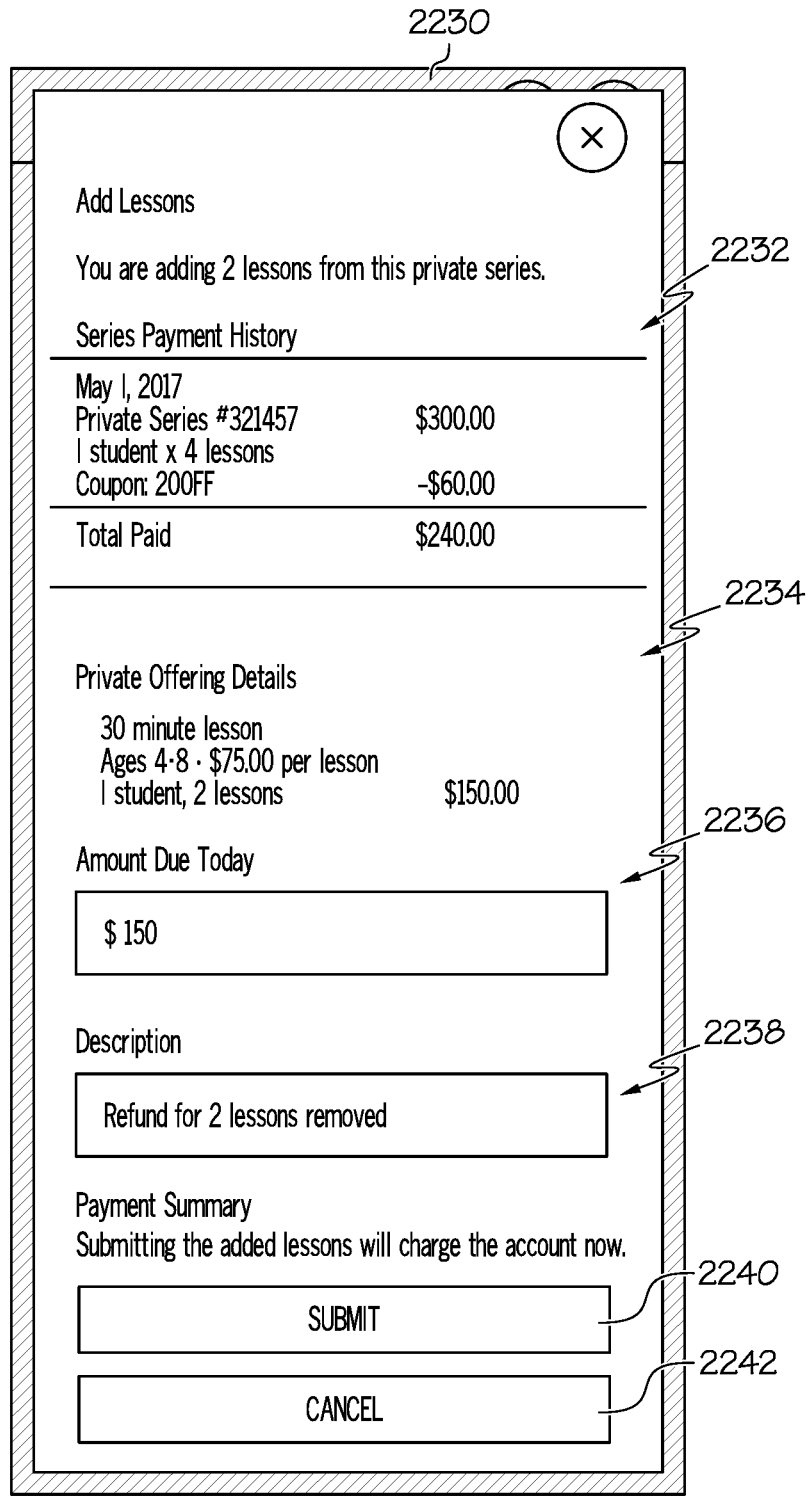
FIG. 22 depicts an administrator user interface for adding a lesson, according to embodiments described herein.

FIG. 22 depicts an administrator user interface 2230 for adding a lesson, according to embodiments described herein. In response to adding a lesson in the administrator user interface 2030 (FIG. 20), the administrator user interface 2230 may be provided. As illustrated, the administrator user interface 2230 provides a series payment history, a private offering details section 2234, an amount due option 2236, a description option 2238, a submit option 2240, and a cancel option 2242.

The series payment section 2232 provides a listing of details related to payments that the user has made under this lesson series. The private offering section provides details on the lessons that are being added to the lesson series. The amount due option 2236 provides an option for the administrator and/or user to indicate the amount due for adding the lessons. If the user has also removed lessons (such as in administrator user interface 2130 of FIG. 21), the amounts being refunded and/or credited may be deducted from the amount owed in the administrator user interface 2230 for adding lessons. The description option 2238 may provide additional details from the user and/or administrator regarding the actions being taken.

Figure 23:
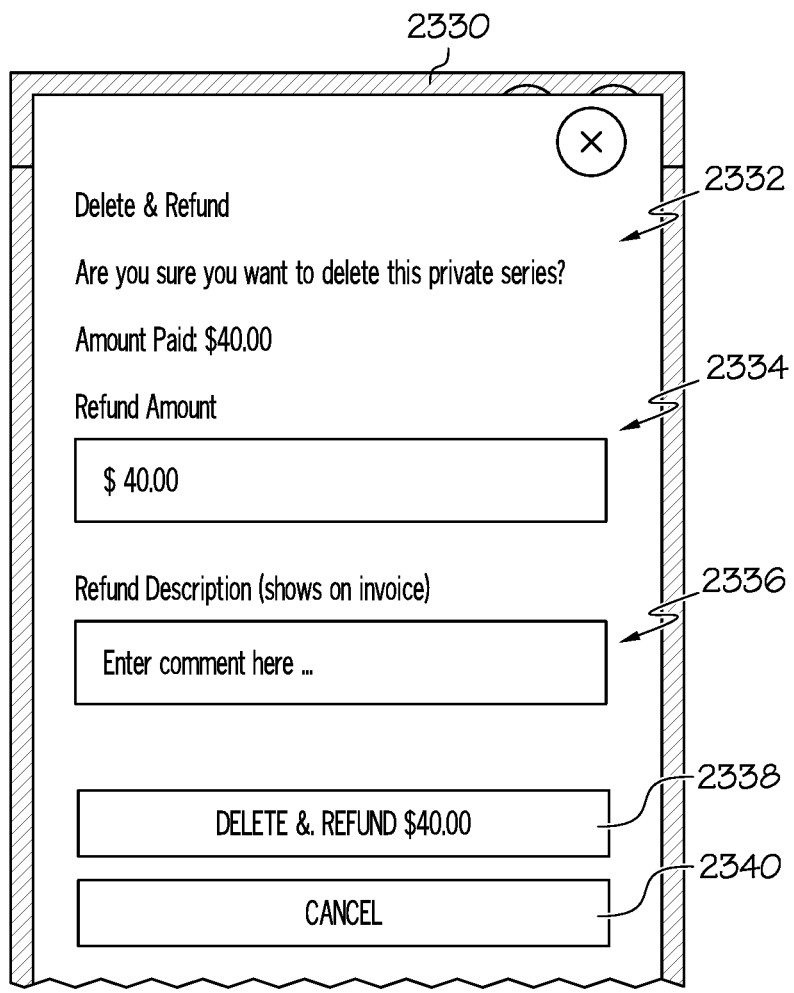
FIG. 23 depicts an administrator user interface for adding a lesson, according to embodiments described herein.

FIG. 23 depicts an administrator user interface 2330 for deleting and refunding, according to embodiments described herein. In response to selection of the submit option 2140 from FIG. 21 and/or the submit option 2240 from FIG. 22, the administrator user interface 2330 may be provided. The administrator user interface 2330 may provide an amount paid field 2332, a refund amount field 2334, a refund description option 2336, a refund option 2338, and a cancel option 2340.

As illustrated, the amount paid field 2332 and the refund amount may be automatically populated, based on amounts determined to have been paid and refunded (based on the data from FIGS. 21 and 22). The user and/or administrator may populate the refund description option 2336. Once the refund is approved, the refund option 2338 may be selected to process the refund.

FIGS. 24A-24D depict varying views of a lesson program, according to embodiments described herein. Specifically, the user interface 2430a depicts a collapsed version of a program, illustrating time, students, student ages, number of students, as well as an assign instructor option 2432a. In response to selection of the assign instructor option 2432a, further options for selecting or otherwise defining an instructor for the particular lesson or lesson series may be provided.

Figure 24B:
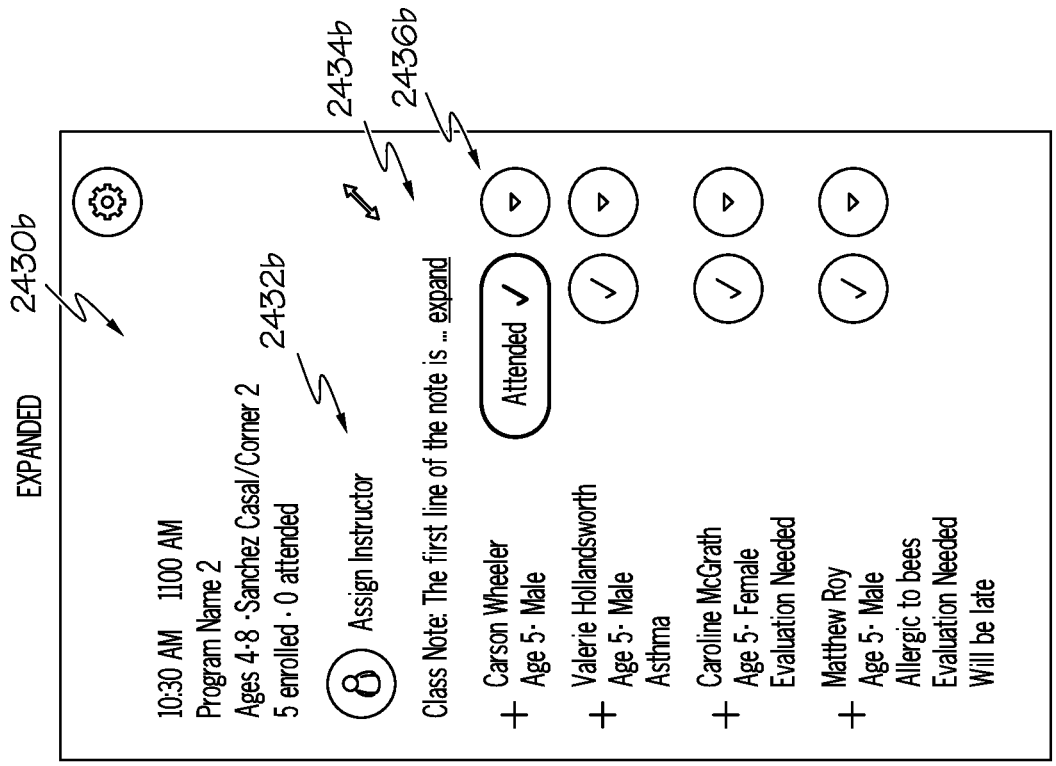
Figure 24A:
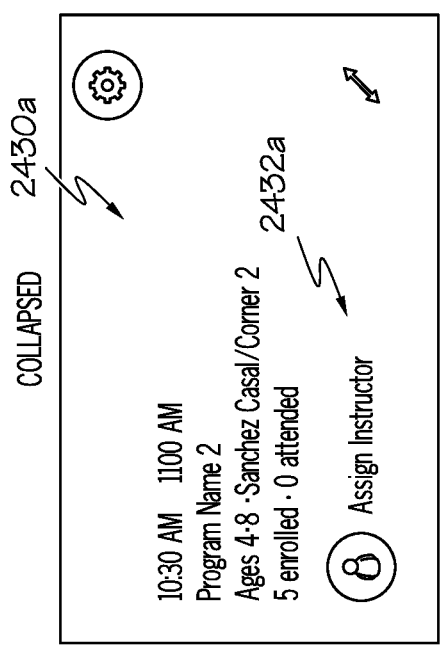

In the user interface 2430b of FIG. 24B, a listing of students enrolled in the lesson are provided. Additionally, attended options 2434b may be provided for indicating whether the student attended the lesson. Other information may be provided via selection of a dropdown option 2436b.

FIG. 24C further illustrates options 2434c and 2436c, which may be utilized for indicating that a student has attended a lesson, as well as moving and/or viewing additional information. FIG. 24D illustrates selected of one of the students from FIGS. 24B and/or 2432c in student section 2432d. In section 2434d, filters may be applied to provide the user with information regarding lessons and/or lesson series that the selected student is enrolled or is otherwise associated. A program section 2436d provides such information.

Figure 25:
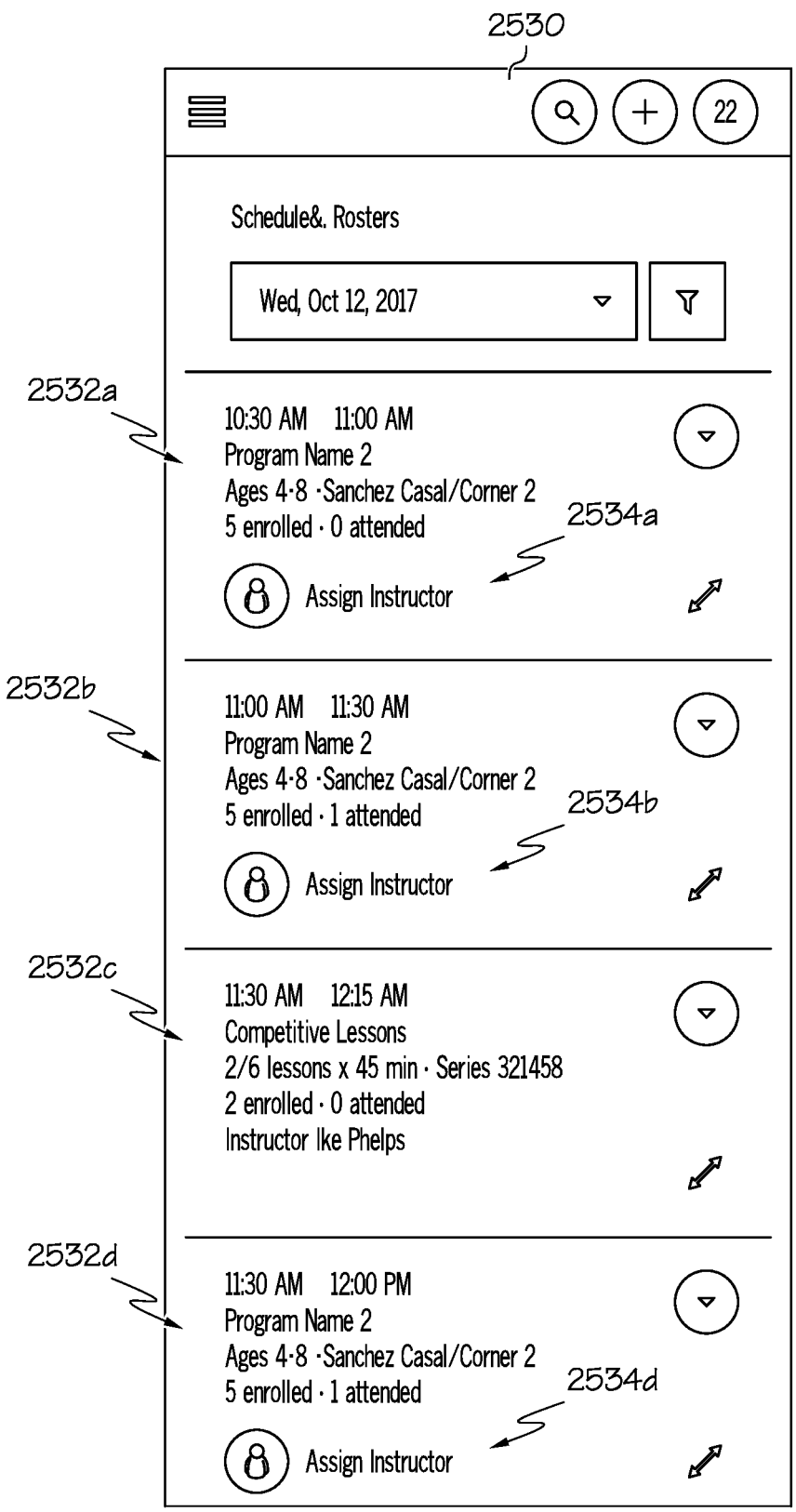
FIG. 25 depicts an administrator user interface for providing a schedule and roster, according to embodiments described herein.

FIG. 25 depicts an administrator user interface 2530 for providing a schedule and roster, according to embodiments described herein. As illustrated, the administrator user interface 2530 may be provided to an administrator for illustrating a roster of lessons or lesson series according to predetermined criteria. In the example of FIG. 25, the schedule has been filtered according to day and the associated lessons are provided in sections 2532a, 2532b, 2532c, and 2532d. Also provided are assign instructor options 2534a, 2534b, and 2534d for the administrator to assign an instructor to those lessons. It should be noted that in section 2532c, the instructor has already been assigned.

Figure 26:
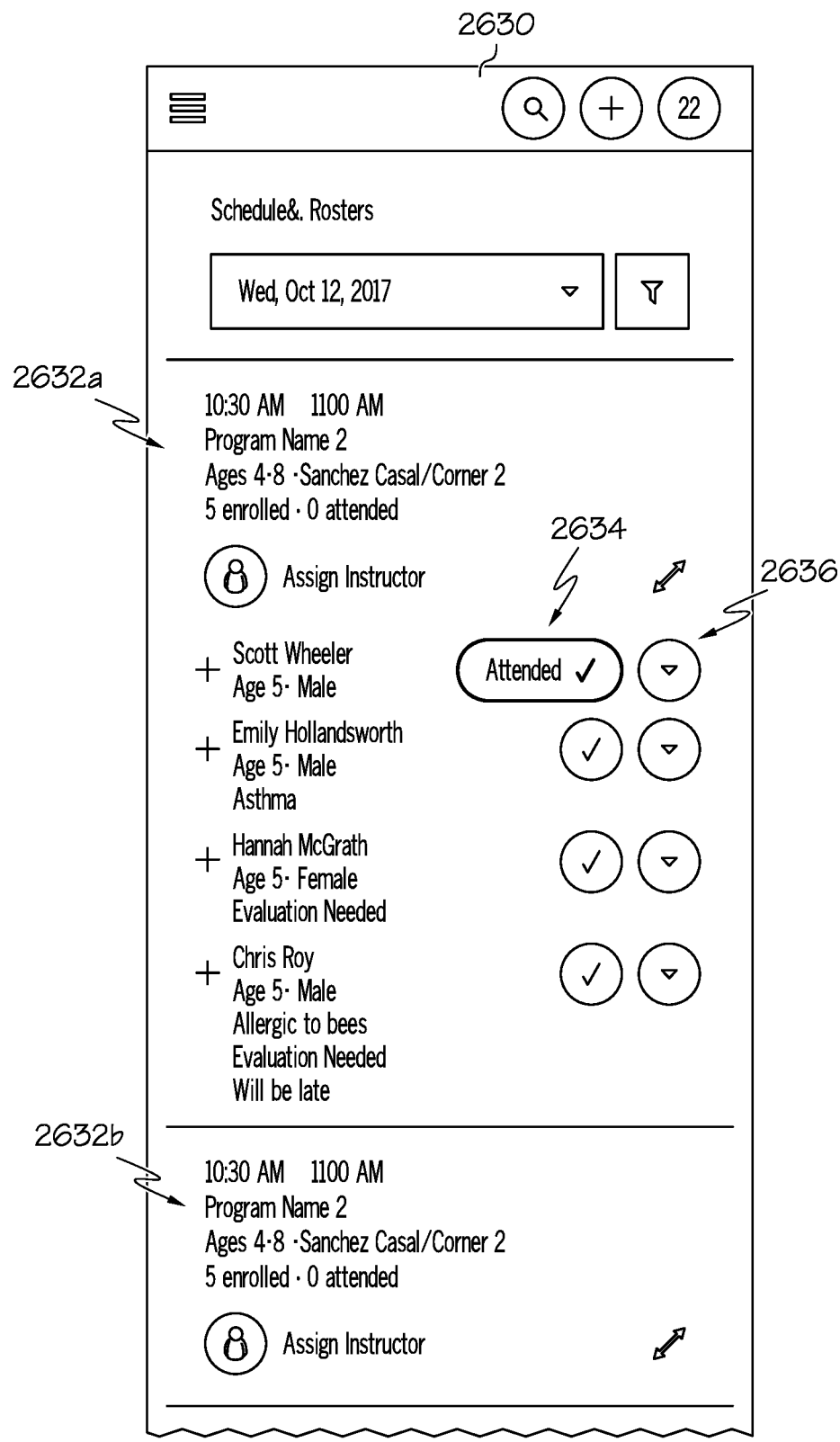
FIG. 26 depicts an administrator user interface for providing additional details of a schedule and roster, according to embodiments described herein.

FIG. 26 depicts an administrator user interface 2630 for providing additional details of a schedule and roster, according to embodiments described herein. As illustrated, the administrator user interface 2630 may provide additional details from the administrator user interface 2530 from FIG. 25. Specifically section 2632a illustrates that a dropdown option has been selected to provide students in the lesson (or lessons) being provided at 10:30 on the selected date. Additional options 2634, 2636 are also provided to indicate that a student attended the lesson and/or for other function. Also provided is section 2632b, which provides similar information for the other lesson timeslots.

Figure 27:
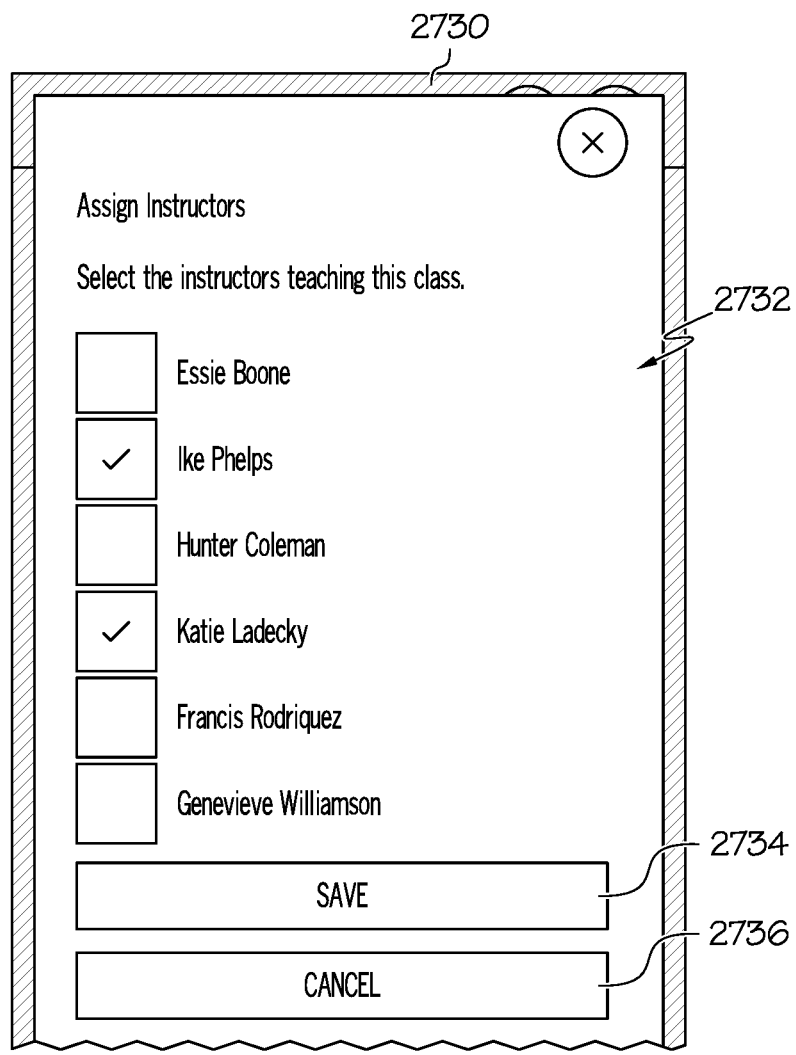
FIG. 27 depicts an administrator user interface for assigning instructors for a plurality of classes, according to embodiments described herein.

FIG. 27 depicts an administrator user interface 2730 for assigning instructors for a plurality of classes, according to embodiments described herein. As illustrated, in response to selecting the assign instructor option 2534 from FIG. 25 or other similar option, the user interface 2730 may be provided. Accordingly, the user interface 2730 includes an instructor section 2732 for selecting one or more instructors for a lesson and/or lesson series. A save option 2734 and a cancel option 2736 are also provided.

Figure 28:
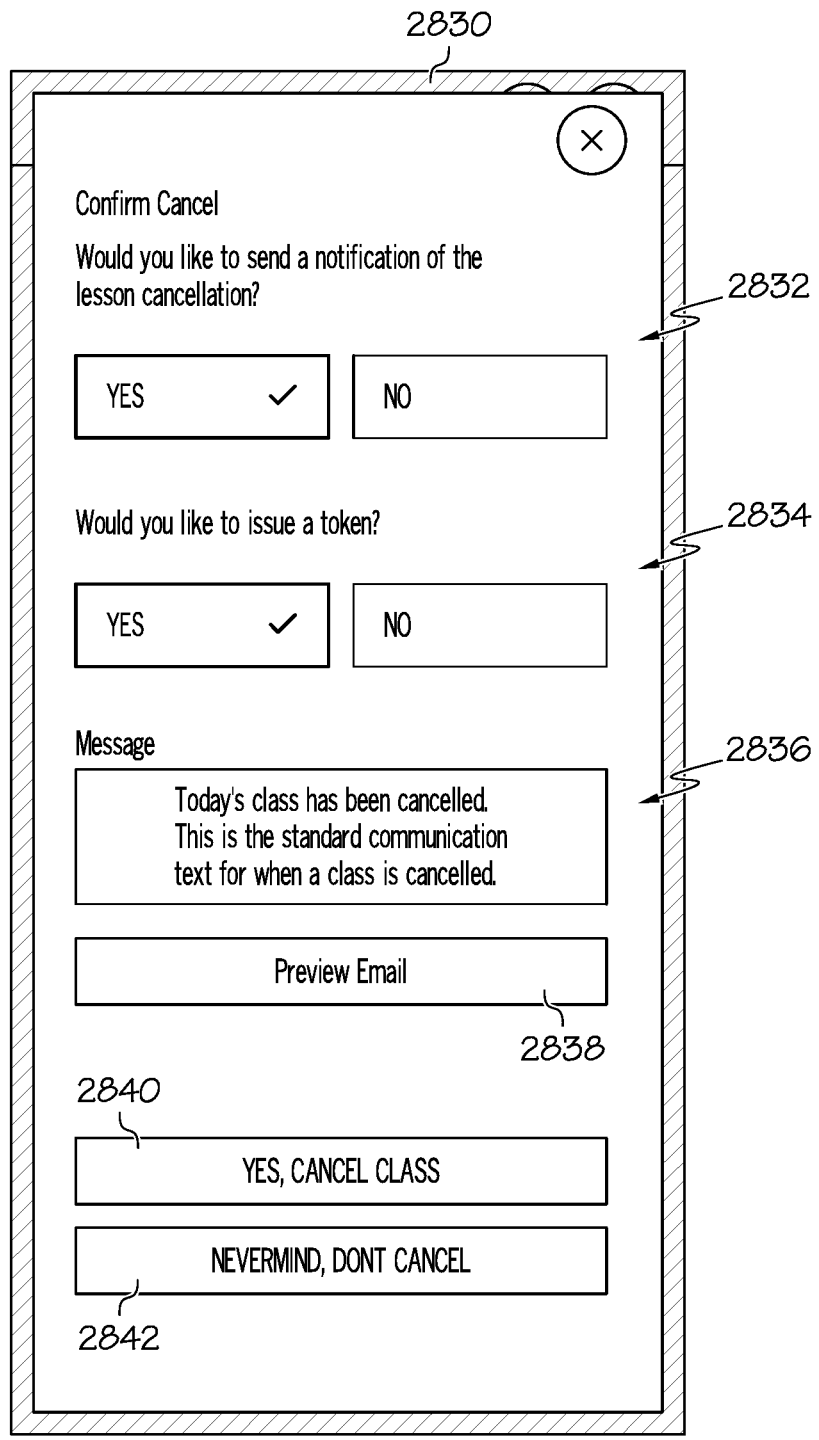
FIG. 28 depicts an administrator user interface for canceling a class, according to embodiments described herein.

FIG. 28 depicts an administrator user interface 2830 for canceling a class, according to embodiments described herein. As illustrated, if an instructor and/or administrator wish to cancel a class, the user interface 2830 may be provided. Accordingly, the user interface 2830 provides a notification option 2832 for selecting whether to send a notification to students and/or others of the cancellation. A token option 2834 may also be provided for issuing a token to redeem at another lesson. A message field 2836 is also provided for the administrator and/or instructor to draft an email indicating the cancellation. A preview option 2838 is provided to preview the cancellation email. A cancel class option 2840 and a "don't cancel class" option 2842 are also provided.

Figure 29A:
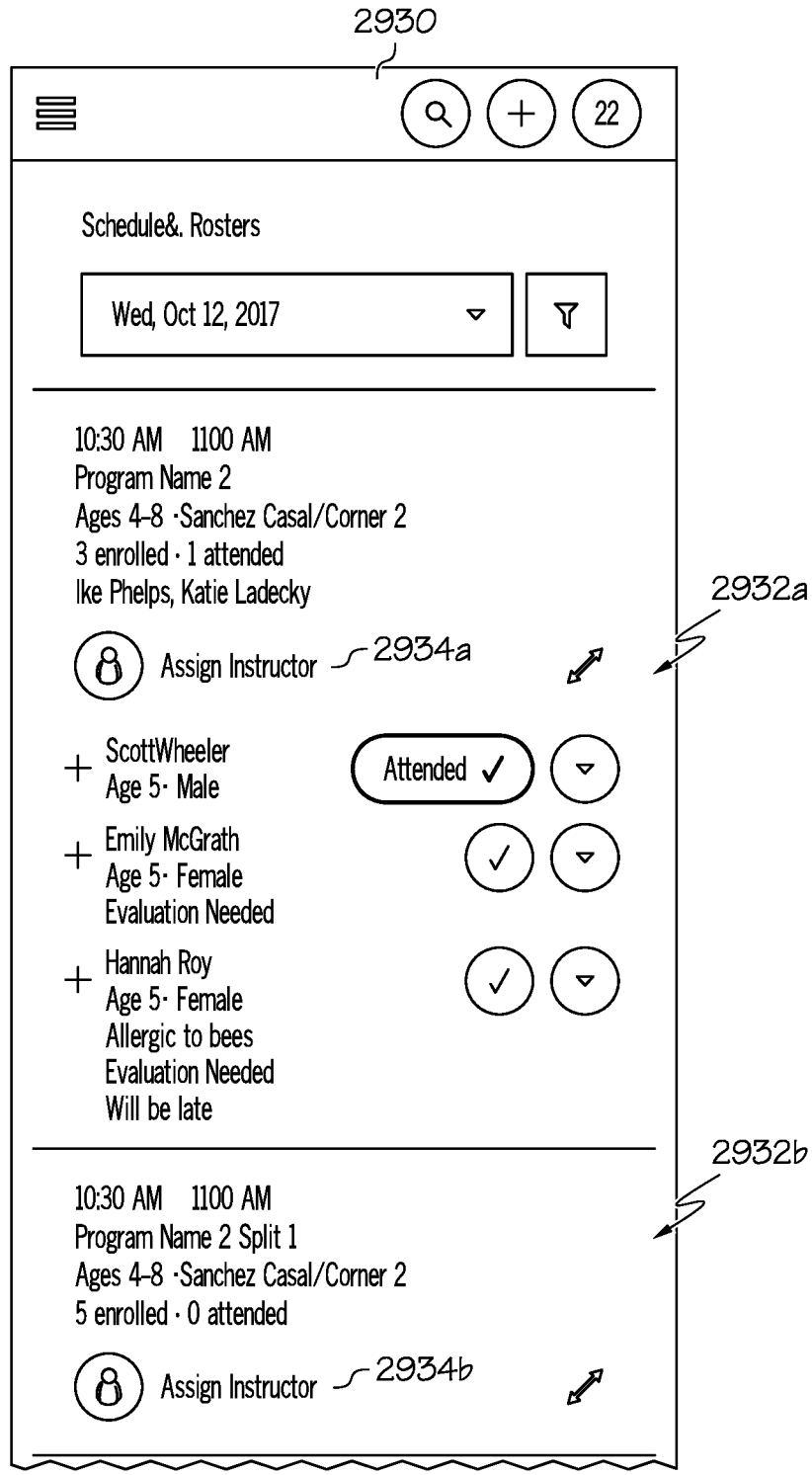
FIGS. 29A, 29B depict an administrator user interface for providing information regarding a canceled class, according to embodiments described herein.
Figure 29B:
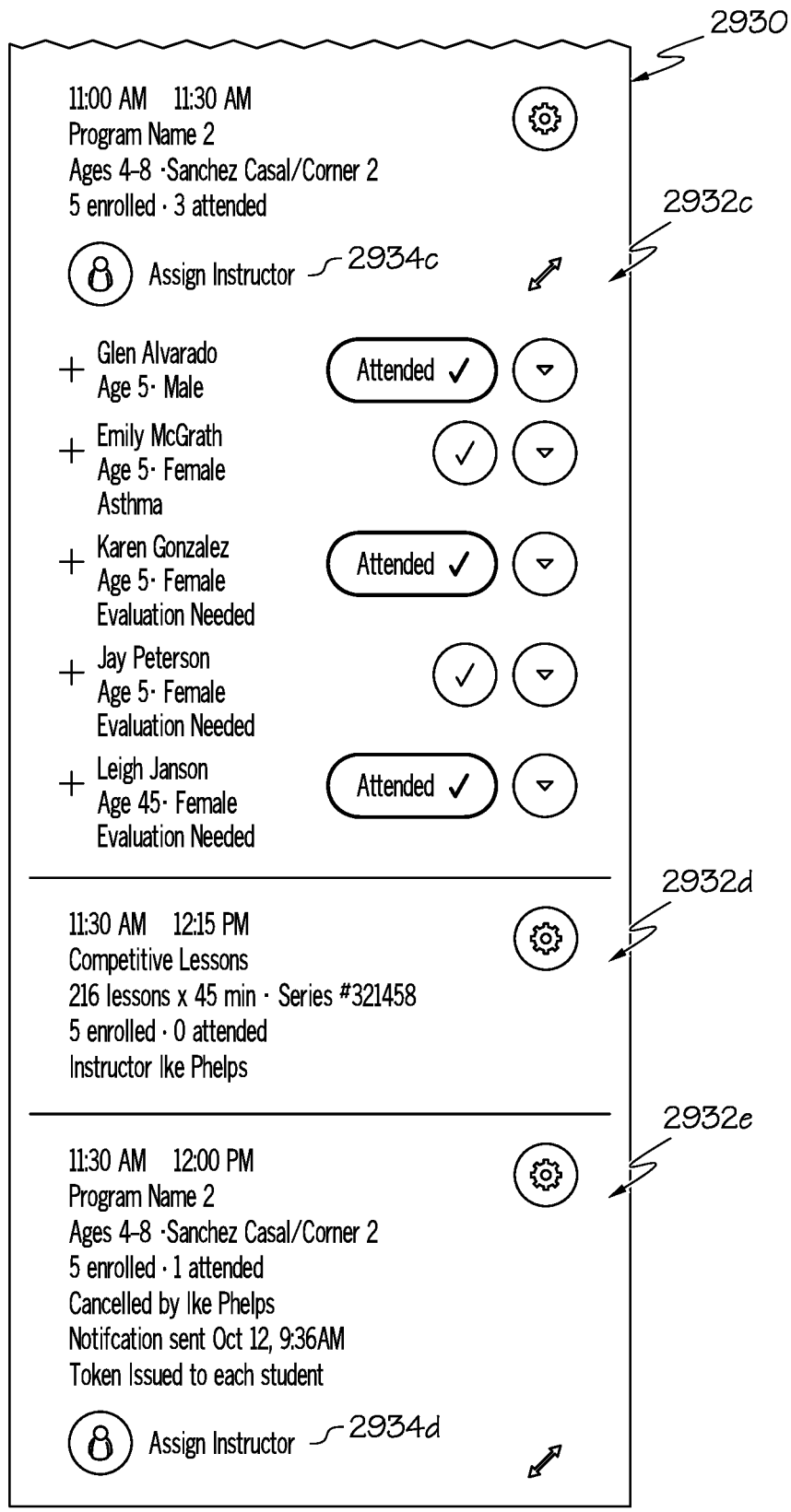

FIGS. 29A, 29B depict an administrator user interface 2930 for providing information regarding a canceled class, according to embodiments described herein. As illustrated, the administrator user interface 2930 is similar to the user interface 2630 from FIG. 26, except that the administrator user interface 2930 provides cancellation data, as well as token information. Specifically, the administrator user interface 2930 provides time sections 2932a (FIG. 29A), 2932b (FIG. 29A), 2932c (FIG. 29B), 2932d (FIG. 29B), and 2932e (FIG. 29B). In the time sections 2932a, 2932b, 2932c, and 2932e there are assign instructors options 2934a, 2934b, 2934c, and 2934e. However, in section 2932d (FIG. 29B), an instructor has already been assigned to Ike. In section 2932e (FIG. 29B), the program has been canceled by Ike and tokens issued to each student to redeem for another lesson.

Figure 30:
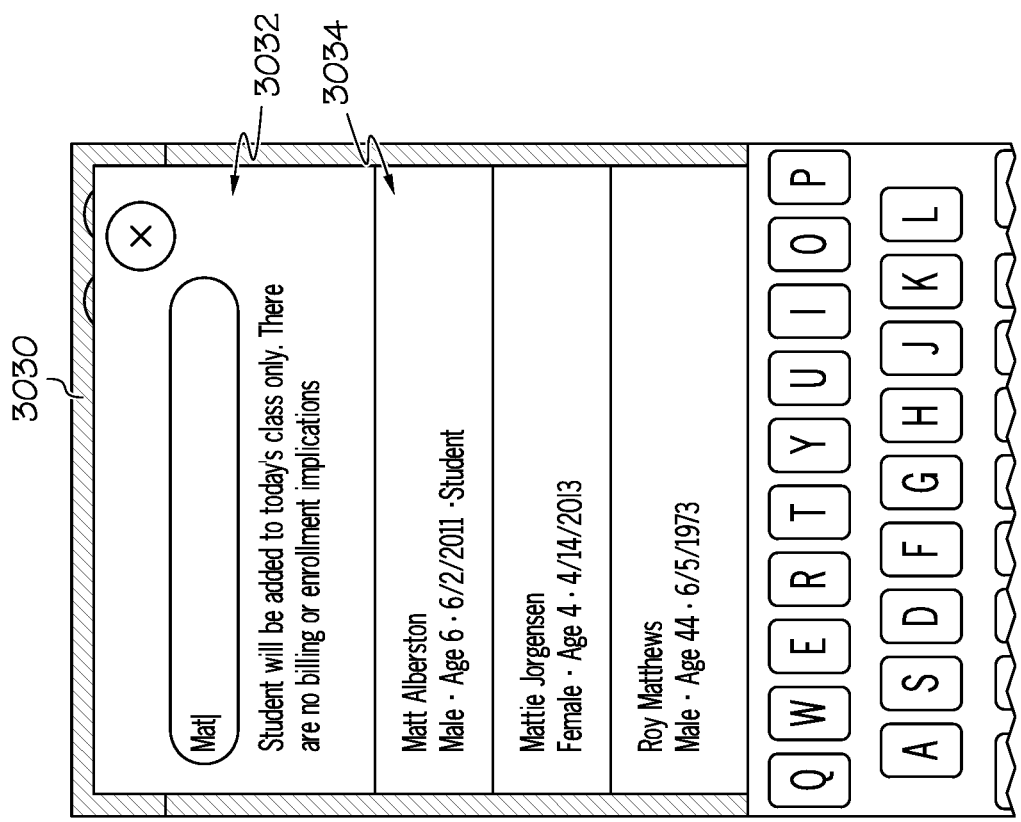
FIG. 30 depicts an administrator user interface for adding a student to a class, according to embodiments described herein.

FIG. 30 depicts an administrator user interface 3030 for adding a student to a class, according to embodiments described herein. As illustrated, the administrator user interface 3030 may provide a mobile option for adding a student to a class. As an example, a teacher, coach, guardian, etc. may desire that a certain student participate in a class. As such, the user may enter the student's name into the field 3032 and/or select the student from the option 3034.

Figure 31:
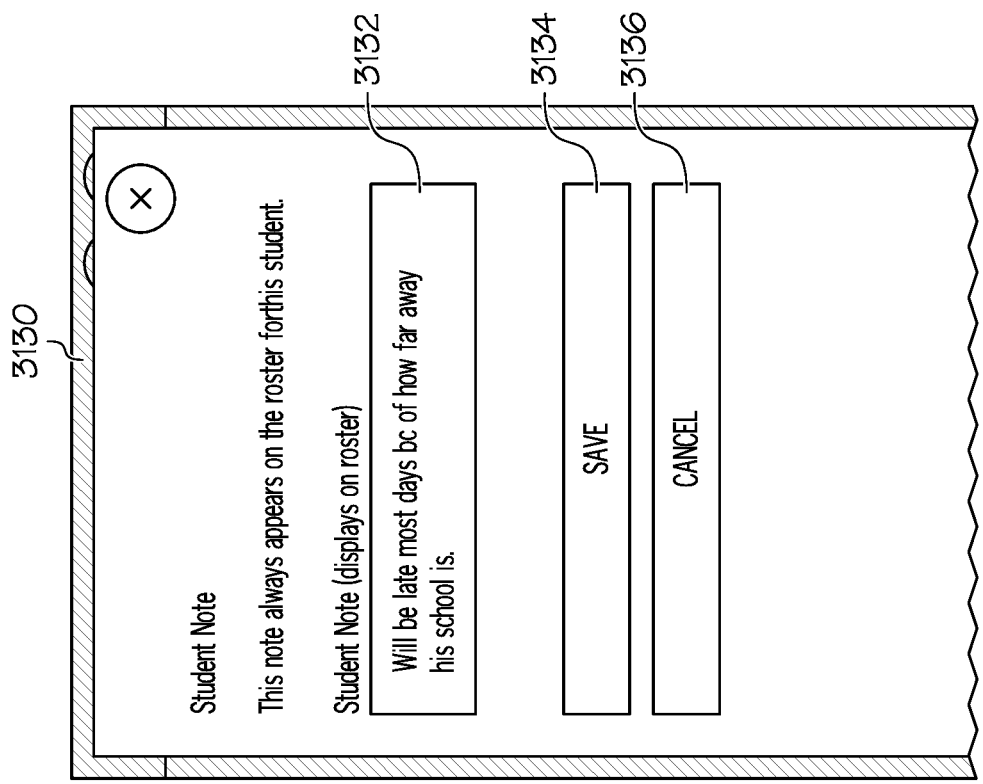
FIG. 31 depicts a mobile interface for adding a student note, according to embodiments described herein.

FIG. 31 depicts a mobile interface 3130 for adding a student note, according to embodiments described herein. As illustrated, the mobile interface 3130 includes a note field 3132 for entering a note on the student's account, such that the note will appear on the roster. As an example, if the student is allergic to peanuts; if the student will be late; etc. these types of notes may be included. A save option 3134 and a cancel option 3136 are also provided.

Figure 32:
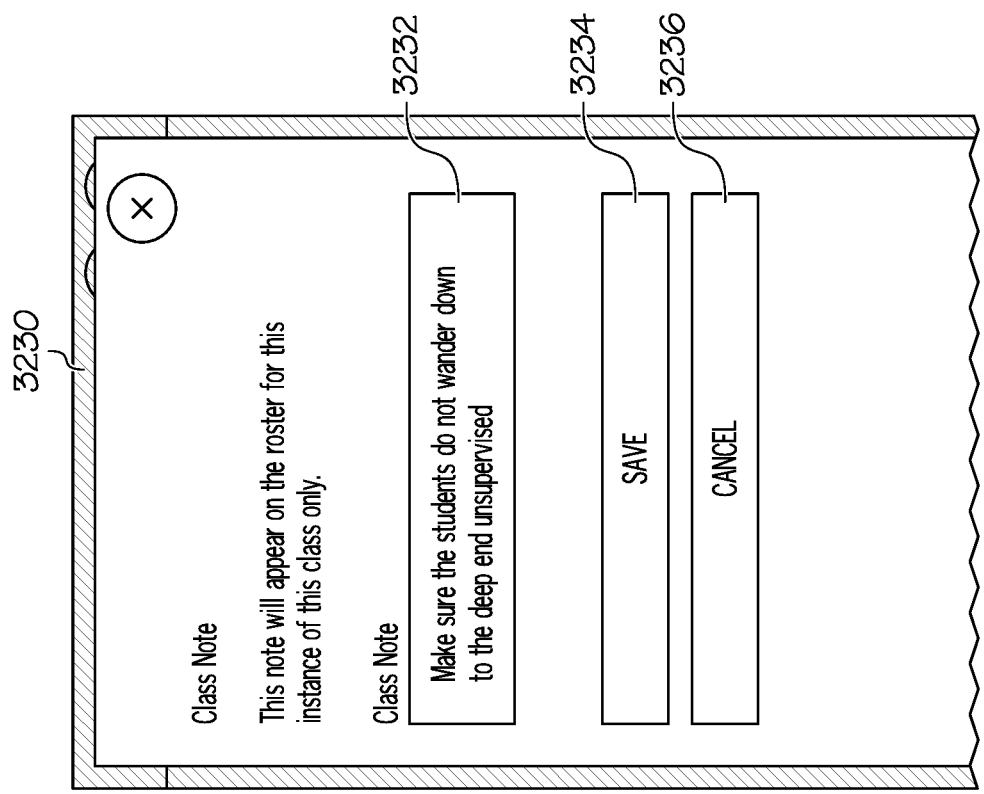
FIG. 32 depicts a student note that will appear on the roster for a predetermined student, according to embodiments described herein.

FIG. 32 depicts a student note 3230 that will appear on the roster for a predetermined student, according to embodiments described herein. Similar to the mobile interface 3130 from FIG. 31, a note may be provided. However, in this example, an instructor and/or administrator may provide a note to the students and/or parents for a particular class. As an example, if rain is predicted for the class, a note may be written in note section 3232 for the students to dress appropriately. A save option 3234 and a cancel option 3236 are also provided.

Figure 33:
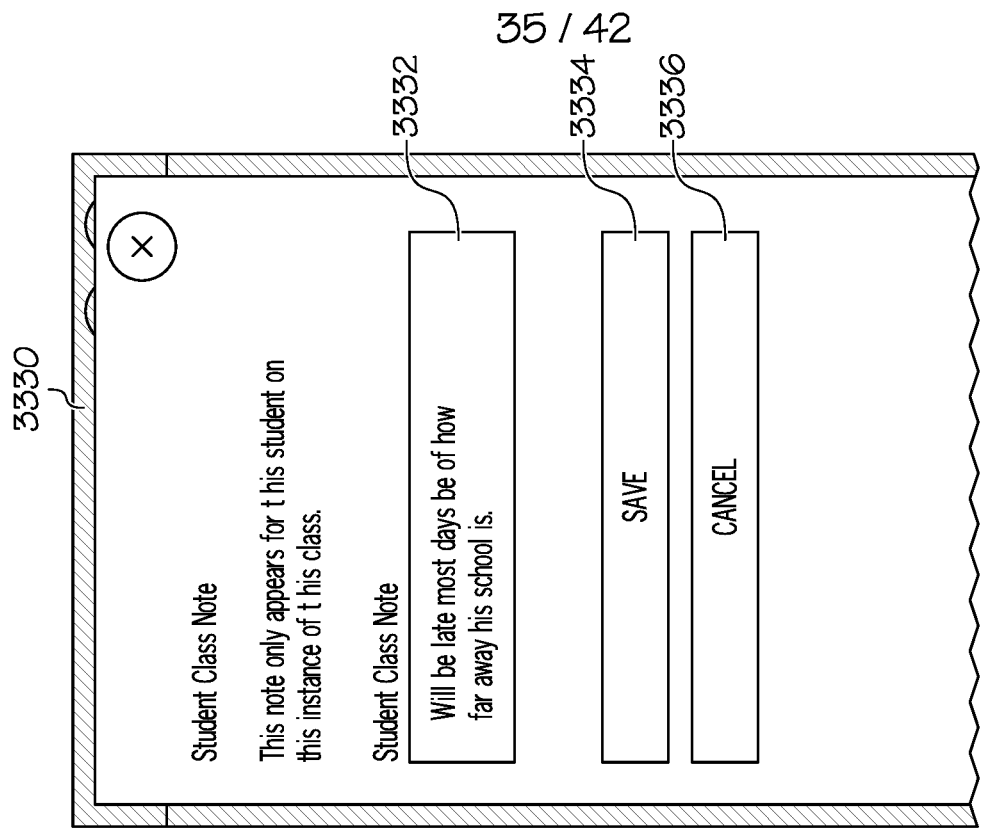
FIG. 33 depicts a student class note that will appear for a particular student on an instance of a predetermined class, according to embodiments described herein.

FIG. 33 depicts a student class note 3330 that will appear for a particular student on an instance of a predetermined class, according to embodiments described herein. As will the mobile interface 3130 (FIG. 31) and the student note 3230 (FIG. 32), the student class note 3330 provides a note field 3332 to create a note. However, the student class note 3330 is a direct message to a particular student or other person. As such, the student class note 3330 may be accessed via that particular student's account and/or an option to define the recipient of the note may be provided. A save option 3334 and a cancel option 3336 are also provided.

Figure 34:
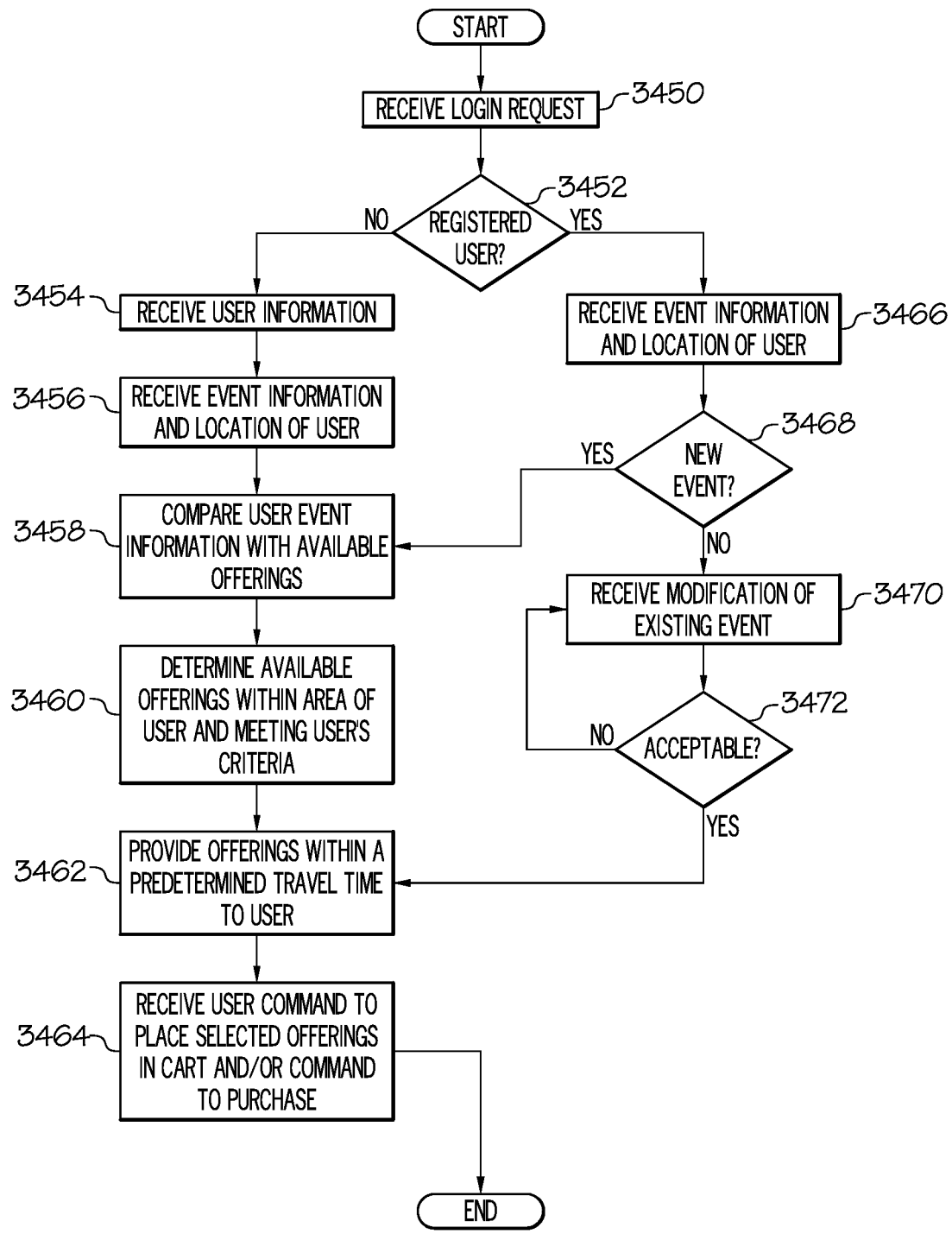
FIG. 34 depicts a flowchart for purchasing an event offering, according to embodiments described herein.

FIG. 34 depicts a flowchart for purchasing an event offering, according to embodiments described herein. As illustrated in block 3450, a login request may be received. In block 3452, a determination may be made regarding whether the user is a registered user. If not, at block 3454, user information may be received. At block 3456, event information and a location of a user may be received. At block 3458, user event information may be compared with available offerings. At block 3460, available offerings may be determined within an area of the user and meeting the user's criteria. In block 3462, offerings within a predetermined travel time to a user may be provided. At block 3464, a user command to place selected offerings in cart and/or user command to purchase is received.

Returning to block 3452, if the login request is received from a registered user, the process proceeds to block 3466. At block 3466, event information and a location of a user are received. Depending on the embodiment, the location of the user may include the user's current location, a house location, a school location, a location at a predetermined time, and/or other location of the user (or student). At block 3468, a determination is made regarding whether this is a new offering. If this is a new event, the process proceeds to block 3458. If this is not a new event, the process proceeds to block 3470. At block 3470, a modification of an existing event is received. At block 3472, a determination is made regarding whether the change is acceptable. If not, the process returns to block 3470. If the change is acceptable, the process proceeds to block 3462.

Figure 35:
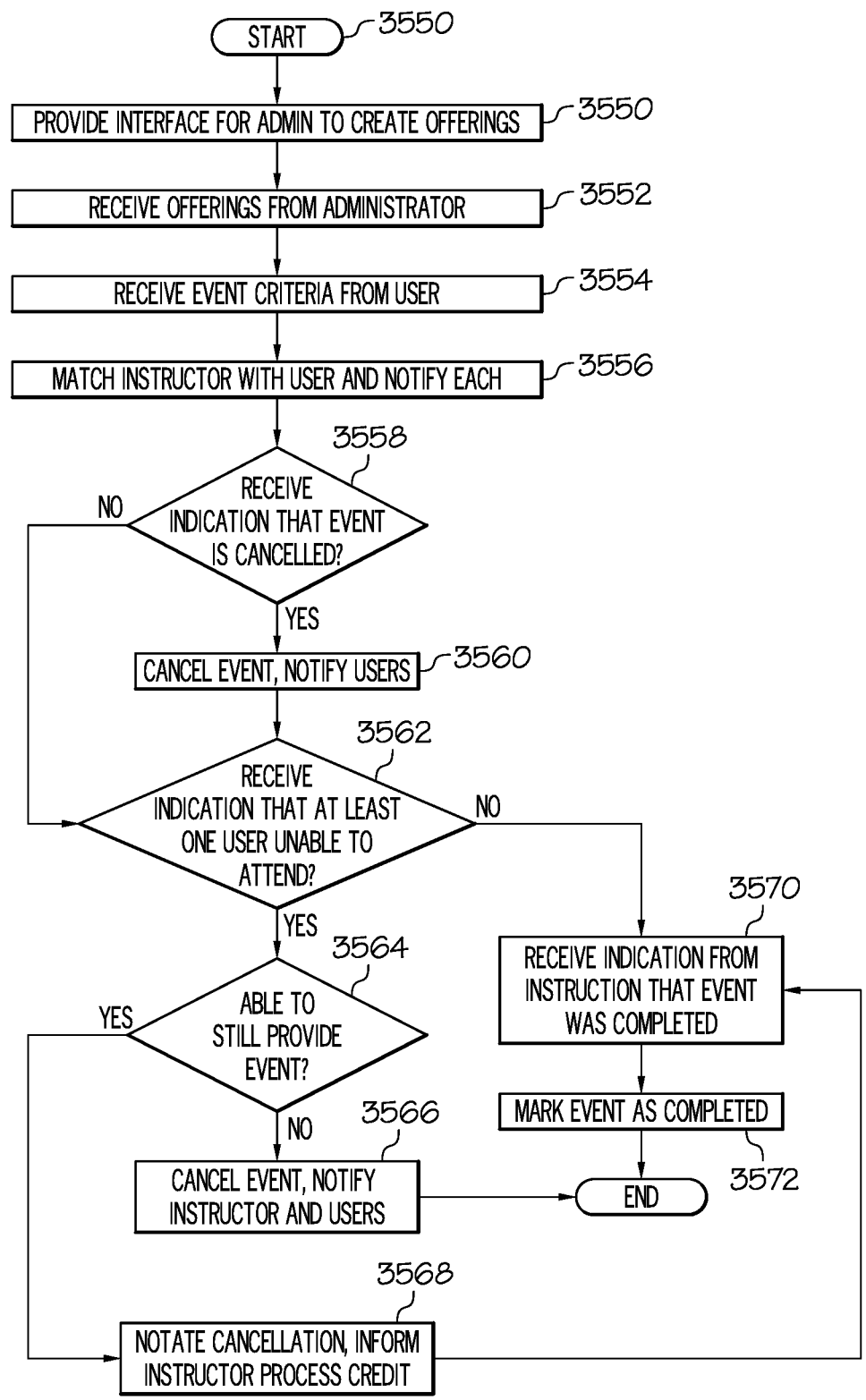
FIG. 35 depicts a flowchart for creating event offerings, according to embodiments described herein.

FIG. 35 depicts a flowchart for creating event offerings, according to embodiments described herein. As illustrated in block 3550, an interface is provided for an administrator to create offerings. At block 3552, one or more offerings may be received from an administrator. At block 3554, event criteria may be received from a plurality of users. The event criteria may include times, locations, types of lessons, and/or other information for each respective user. At block 3556, an instructor may be matched with a plurality of users for a particular event and both the instructor and the user may be notified. At block 3558, a determination may be made regarding whether the instructor has canceled the event. If so, at block 3560, the event may be canceled and the users who were scheduled to attend the event may be notified.

If the instructor did not cancel the event at block 3558 or at some point before or after block 3558, at block 3562, a determination may be made regarding whether one or more users that are scheduled to attend the event have canceled. If so, at block 3564, a determination is made whether there are still enough students available to conduct the event. This determination may be based on the type of event, the instructor, the facility, and/or other factors. If there are not enough students to conduct the event, at block 3566, the event may be canceled; the instructor may be notified, and the remaining users may be notified. The process may then end.

If, at block 3564, there are enough students available to conduct the event, at block 3568, the cancellation may be notated; the instructor may be informed; and, if available, a credit, refund, and/or token may be processed for the canceled student. The process may then proceed to block 3570, where the event was competed, and an indication that the event was completed may be received from the instructor and/or one or more of the users. The event may be marked as completed.

Figure 36:
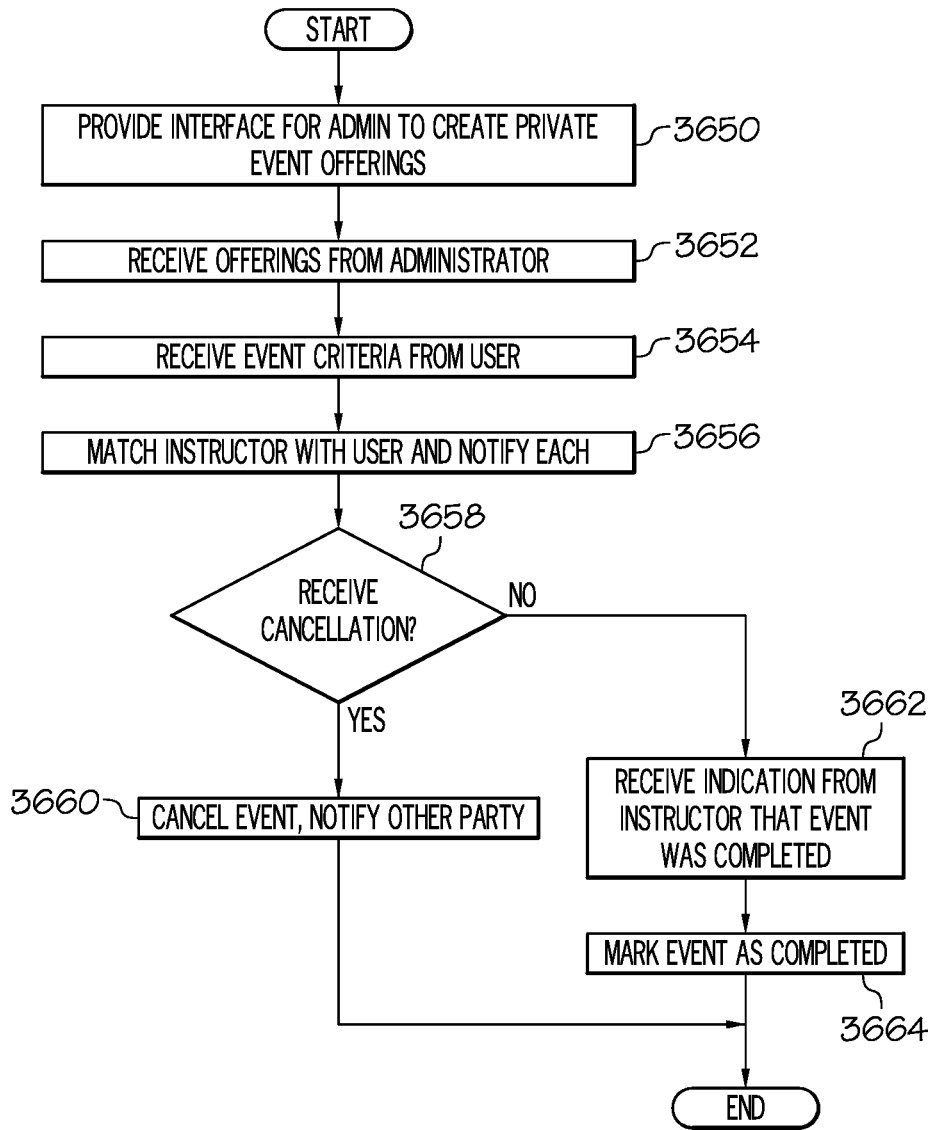
FIG. 36 depicts a flowchart for creating a private offering, according to embodiments described herein.

FIG. 36 depicts a flowchart for creating a private offering, according to embodiments described herein. As illustrated at block 3650, an interface of an administrator to create one or more private event offerings may be provided. At block 3652, offerings may be received from an administrator. As discussed above, the offerings may be related to one or more private lesson offerings or similar events. At block 3654, event criteria may be received from a user. At block 3656, an instructor may be matched with the user and each may be notified. At block 3658, a determination may be made regarding whether a cancellation was received. A cancellation may be received from a user, student, instructor, administrator, facility administrator, and/or from others. If a cancellation was received, at block 3660, the event may be canceled, the other parties may be notified, and the process may end. If, at block 3658, no cancellation was received, an indication from the instructor may be received that the event was completed, as shown in block 3662. At block 3664, the event may be marked as completed.

Figure 37:
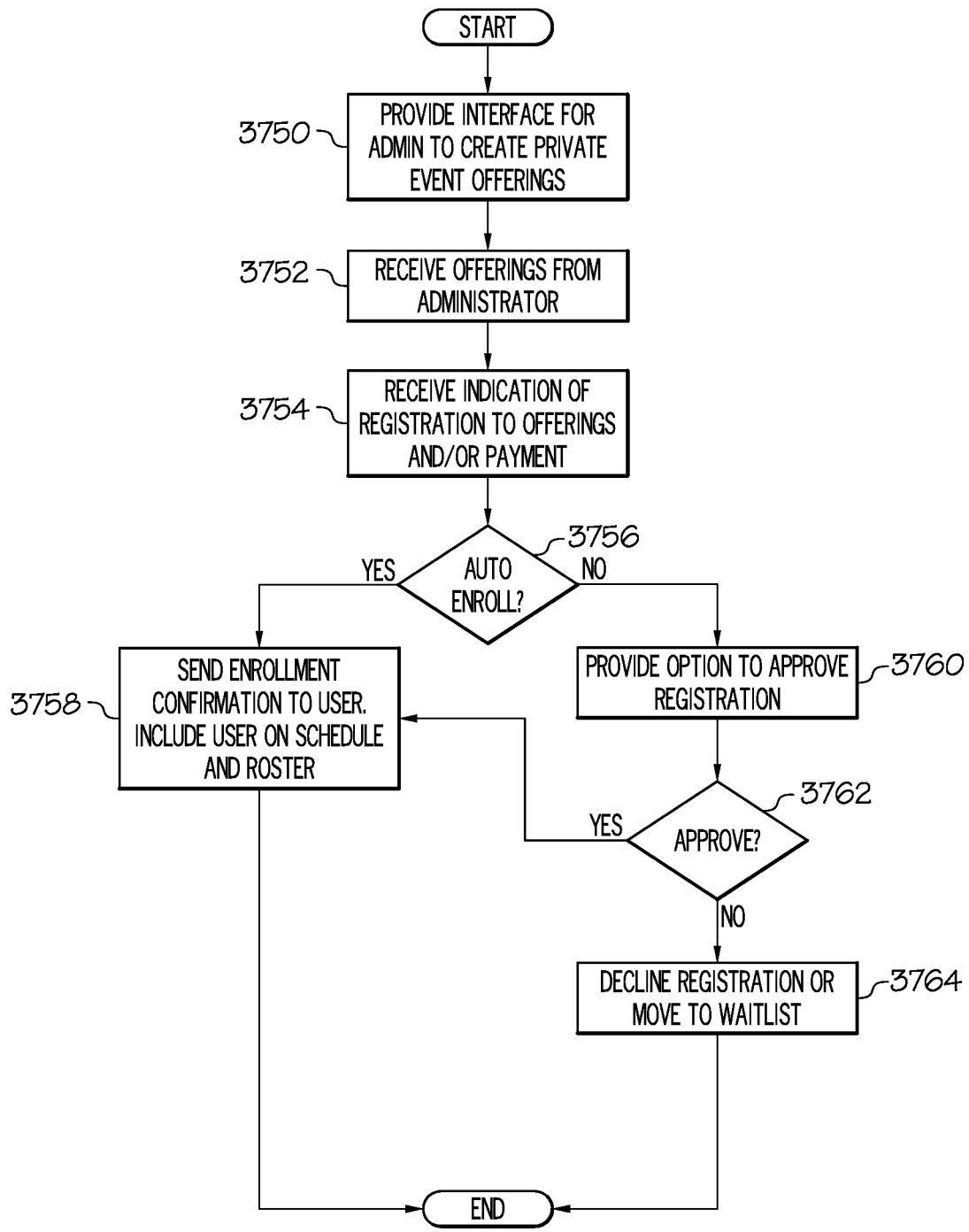
FIG. 37 depicts a flowchart for creating a private offering, according to embodiments described herein.

FIG. 37 depicts a flowchart for creating a private offering, according to embodiments described herein. As illustrated at block 3750, an interface for an administrator to create group event offerings may be provided. At block 3752, offerings may be received from the administrator. At block 3754, an indication of registration to one of the offerings and/or an indication of payment from a user may be received. At block 3756, a determination may be made regarding whether the user is set up for auto-enroll. If so, at block 3758, an enrollment confirmation may be sent to a user and the user may be included on the associated schedule and roster for one or more of the offerings. If not, at block 3760, an option to approve registration may e provided. At block 3762, a determination may be made regarding whether the user approves registration. If so, the process returns to block 3758. If not, at block 3764, registration may be declined or moved to a waitlist.

Figure 38:
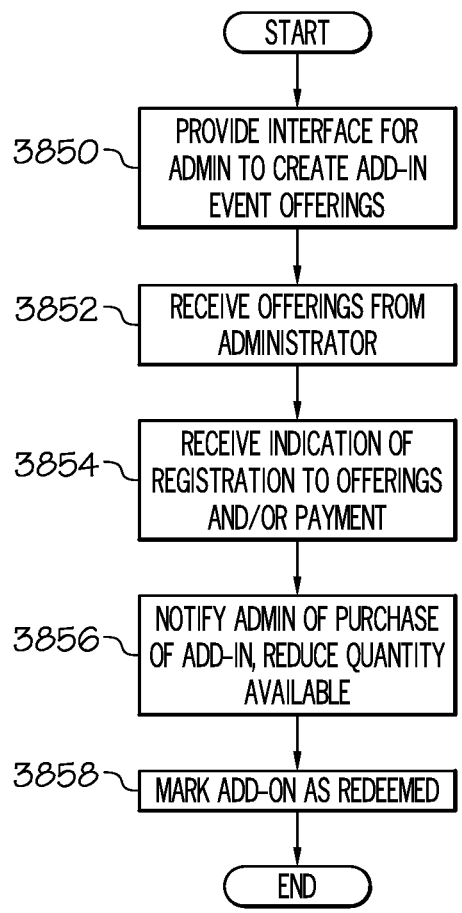
FIG. 38 depicts a flowchart for creating an add-in event offering, according to embodiments described herein.

FIG. 38 depicts a flowchart for creating an add-in event offering, according to embodiments described herein. As illustrated at block 3850, an interface for an administrator to create an add-in event offering. At block 3852, offerings may be received from an administrator. At block 3854, an indication of registration to one or more of the offerings and/or a payment confirmation from a user may be received. At block 3856, an administrator may be notified of the purchase, and quantity available may be updated. At block 3858, the add-on may be marked as redeemed.

Figure 39:
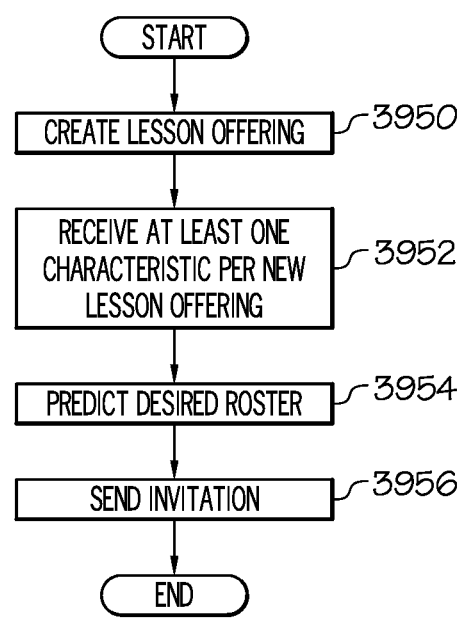
FIG. 39 depicts a flowchart for creating a new lesson offering, according to embodiments described herein.

FIG. 39 depicts a flowchart for creating a new lesson offering, according to embodiments described herein. As illustrated at block 3950, a new lesson offering is created. At block 3952, at least one characteristic for the new lesson offering may be received. At block 3954, a desired roster for the new lesson offering may be predicted, where the desired roster includes at least one student, and where the desired roster for the new lesson is predicted from the at least one characteristic. At block 3956, an invitation to the at least one student to sign up for the new lesson may be sent.

FIG. 40 depicts a remote computing device 104 for providing electronic lesson management. The remote computing device 104 includes a processor 4030, input/output hardware 4032, the network interface hardware 4034, a data storage component 4036 (which stores lesson data 4038*a*, roster data 4038*b*, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 104 and/or external to the remote computing device 104.

The memory component 140 may store operating logic 4042, the lesson management logic 144*a* and the roster management logic 144*b*. The lesson management logic 144*a* and the roster management logic 144*b* may each include a plurality of different pieces of logic, each of which may be embodied as a computer program, firmware, and/or hardware, as an example. A local communications interface 4046 is also included in FIG. 40 and may be implemented as a bus or other communication interface to facilitate communication among the components of the remote computing device 104.

The processor 4030 may include any processing component operable to receive and execute instructions (such as from a data storage component 4036 and/or the memory component 140).

The network interface hardware 4034 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the remote computing device 104 and other computing devices, such as via the network 100 to provide the functionality described herein.

The operating logic 4042 may include an operating system and/or other software for managing components of the remote computing device 104. As also discussed above, the lesson management logic 144a may reside in the memory component 140 and may be configured to cause the processor 4030 to create, edit, delete, and otherwise manage lessons and other offerings described herein. Similarly, the roster management logic 144b may be utilized to manage the roster of a class or offering, as well as cause the remote computing device 104 to communicate with students and instructors regarding roster changes.

It should be understood that while the components in FIG. 40 are illustrated as residing within the remote computing device 104, this is merely an example. In some embodiments, one or more of the components may reside external to the remote computing device 104. It should also be understood that, while the remote computing device 104 is illustrated as a single device, this is also merely an example. In some embodiments, the lesson management logic 144a and the roster management logic 144b may reside on different computing devices. As an example, one or more of the functionality and/or components described herein may be provided by another computing device, such as the student computing device 102a, the instructor computing device 102b, the administrator computing device 102c, etc.

Additionally, while the remote computing device 104 is illustrated with the lesson management logic 144a and the roster management logic 144b as separate logical components, this is also an example. In some embodiments, a single piece of logic may cause the remote computing device 104 to provide the described functionality.

As illustrated above, various embodiments electronic lesson management are disclosed. These embodiments cause more efficient lesson creation, signup, and editing. Additionally, these embodiments provide a mechanism by which strategic lesson offering and placement of students may be performed.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for electronic lesson management. It should also be understood that these embodiments are merely exemplary and are not intended to limit the scope of this disclosure.

What is claimed is:

1. A method for electronic lesson management comprising:
    providing a user interface for a user to create a new lesson offering of a series of athletic lessons at a user-selected time for the user to be a student in the new lesson offering to practice an athletic skill;
    creating the new lesson offering of the series of athletic lessons at the user-defined time for a plurality of students to practice the athletic skill;
    receiving at least one characteristic for the new lesson offering, wherein the at least one characteristic includes at least one of the following: a preferred day for the new lesson offering, a preferred location for the new lesson, or a preferred instructor of the new lesson;
    determining a day for the new lesson offering, a location for the new lesson and an instructor for the new lesson, based on an availability of training facilities, location of the student, and location of potential instructors;
    predicting a desired roster for the new lesson offering, wherein the desired roster includes the plurality of students who are predicted to sign up for the new lesson offering, and wherein the desired roster for the new lesson offering is predicted from the at least one characteristic;
    sending an invitation to only the plurality of students to sign up for the new lesson offering;
    providing an electronic user interface for the plurality of students to claim the new lesson offering;
    in response to receiving an indication from the electronic user interface that at least one student of the plurality of students claimed the new lesson offering, reserving spot in the new lesson offering for the at least one student in a remote computing device;
    determining a different offering for the at least one student;
    automatically reassigning the at least one student to the different offering instead of the new lesson offering;
    notifying the student of reassignment;
    receiving negative feedback regarding the instructor;
    determining that the instructor is not fit for instructing the at least one student in the new lesson offering; and
    replacing the instructor in the new lesson offering with a new instructor.

2. The method of claim 1, further comprising:
    providing a user interface with an option related to a name of the at least one student;
    in response to receiving selection of the option, determining a new offering for the at least one student;
    automatically assigning the at least one student to the new offering; and
    notifying the at least one student of reassignment to the new offering.

3. The method of claim 1, wherein the at least one characteristic includes at least one of the following: current rosters offered by an instructor, current skill level and schedule of students, or based on other criteria.

4. The method of claim 1, further comprising:
    receiving a cancelation notification from the at least one student for the new lesson offering;
    determining whether there are enough students to still provide the new lesson offering; and
    in response to determining that there are enough students to still provide the new lesson offering, notating the cancelation notification, notifying an instructor that is associated with the new lesson offering, and processing at least one of the following: a credit, a refund, and a token.

5. The method of claim 4, further comprising, in response to determining that there are not enough students to still provide the new lesson offering, cancel the new lesson offering and notify the instructor.

6. The method of claim 1, further comprising:
providing a user interface to a user to provide an add-on event offering;
receiving the add-on event offering from an administrator;
receiving indication of registration to the add-on event offering by the user;
notifying the administrator of a purchase of the add-on event offering;
reducing a quantity available of the add-on event offering; and
marking the add-on event offering as redeemed.

7. The method of claim 1, further comprising:
receiving an indication of registration;
determining whether a user is set up for auto-enroll; and
in response to determining that the at least one student is set up for auto-enroll, sending enrollment confirmation to the user and including the user on an associated schedule and roster.

8. A system for electronic lesson management comprising:
a memory component that stores logic that, when executed by a computing device, causes the system to perform at least the following:
provide a user interface for a user to create a new lesson offering of a series of athletic lessons at a user-selected time for the user to be a student in the new lesson offering to practice an athletic skill;
create the new lesson offering of the series of lessons for a plurality of students to practice the athletic skill;
receive at least one characteristic for the new lesson offering, wherein the at least one characteristic includes a preferred day for the new lesson offering, a preferred location for the new lesson, or a preferred instructor of the new lesson;
determine a day for the new lesson offering, a location for the new lesson and an instructor for the new lesson, based on an availability of training facilities, location of the student, and location of potential instructors;
predict a desired roster for the new lesson offering, wherein the desired roster includes the plurality of students who are predicted to sign up for the new lesson offering, and wherein the desired roster for the new lesson offering is predicted from the at least one characteristic;
send an invitation to the potential students to sign up for the new lesson;
receive a response to the invitation;
alter the at least one characteristic of the new lesson offering, based on the response;
send another invitation to the potential students;
provide an electronic user interface for display of a computer for the plurality of students to claim the new lesson offering;
in response to receiving an indication from the electronic user interface that at least one student of the plurality of students claimed the new lesson offering, reserve spot in the new lesson offering for the at least one student in a remote computing device;

determine a different offering for the at least one student;
automatically reassign the at least one student to the different offering instead of the new lesson offering;
notify the student of reassignment;
receive negative feedback regarding the instructor;
determine that the instructor is not fit for instructing the at least one student in the new lesson offering; and
replace the instructor in the new lesson offering with a new instructor.

9. The system of claim 8, wherein the logic further causes the system to perform at least the following:
provide a user interface with an option related to a name of the at least one student;
in response to receiving selection of the option, determine a new offering for the at least one student;
automatically assign the at least one student to the new offering; and
notify the at least one student of reassignment to the new offering.

10. The system of claim 8, wherein the at least one characteristic includes at least one of the following: current rosters offered by an instructor, current skill level and schedule of students, or based on other criteria.

11. The system of claim 8, wherein the logic further causes the system to perform at least the following:
receive a cancelation notification from the at least one student for the new lesson offering;
determine whether there are enough students to still provide the new lesson offering; and
in response to determining that there are enough students to still provide the new lesson offering, notate the cancelation notification, notify an instructor that is associated with the new lesson offering, and process at least one of the following: a credit, a refund, and a token.

12. The system of claim 11, wherein the logic further causes the system to cancel the new lesson offering and notify the instructor, in response to determining that there are not enough students to still provide the new lesson offering.

13. The system of claim 8, wherein the logic is further configured to perform at least the following:
provide a user interface to a user to provide an add-on event offering;
receive the add-on event offering from an administrator;
receive indication of registration to the add-on event offering by the user;
notify the administrator of a purchase of the add-on event offering;
reduce a quantity available of the add-on event offering; and
mark the add-on event offering as redeemed.

14. The system of claim 8, wherein the logic is further configured to perform at least the following:
receive an indication of registration;
determine whether a user is set up for auto-enroll; and
in response to determining that the at least one student is set up for auto-enroll, send enrollment confirmation to the user and include the user on an associated schedule and roster.

15. A non-transitory computer-readable medium for electronic lesson management that, when executed by a computing device, causes the computing device to perform at least the following:
provide a user interface for a user to create a new lesson offering of a series of athletic lessons at a user-selected time for the user to be a student in the new lesson offering to practice an athletic skill;

create the new lesson offering of the series of athletic lessons for a plurality of students to practice an athletic skill, wherein the new lesson offering includes an instructor, a location, and the athletic skill;

receive, from an administrator, at least one characteristic for the new lesson offering, wherein the at least one characteristic includes at least one of the following: a location of potential instructors, a preferred day for the new lesson offering, a preferred location for the new lesson, or a preferred instructor of the new lesson;

determine a day for the new lesson offering, a location for the new lesson and an instructor for the new lesson, based on an availability of training facilities, location of the student, and location of potential instructors;

predict a desired roster for the new lesson offering, wherein the desired roster includes a plurality of students who are predicted to sign up for and attend the new lesson offering, and wherein the desired roster for the new lesson offering is predicted from the at least one characteristic;

send an invitation to a user that is related to the at least one student to sign up for the new lesson;

receive a response to the invitation from the user;

alter the instructor of the new lesson offering, based on the response;

send another invitation to the plurality of students;

provide an electronic user interface for display of a computer for the plurality of students to claim the new lesson;

in response to receiving an indication from the electronic user interface that at least one student of the plurality of students claimed the new lesson offering, reserve spot in the new lesson offering for the at least one student in a remote computing device;

determine a different offering for the at least one student;

automatically reassign the at least one student to the different offering instead of the new lesson offering;

notify the student of reassignment;

receive negative feedback regarding the instructor;

determine that the instructor is not fit for instructing the at least one student in the new lesson offering; and replace the instructor in the new lesson offering with a new instructor.

16. The non-transitory computer-readable medium of claim 15, wherein the logic further causes the computing device to perform at least the following:

provide a user interface with an option related to a name of the at least one student;

in response to receiving selection of the option, determine a new offering for the at least one student;

automatically assign the at least one student to the new offering; and notify the at least one student of reassignment to the new offering.

17. The non-transitory computer-readable medium of claim 15, wherein the at least one characteristic includes at least one of the following: current rosters offered by an instructor, current skill level and schedule of students, or based on other criteria.

18. The non-transitory computer-readable medium of claim 15, wherein the logic further causes the computing device to perform at least the following:

receive a cancelation notification from the at least one student for the new lesson offering;

determine whether there are enough students to still provide the new lesson offering;

in response to determining that there are enough students to still provide the new lesson offering, notate the cancelation notification, notify an instructor that is associated with the new lesson offering, and process at least one of the following: a credit, a refund, and a token; and cancel the new lesson offering and notify the instructor, in response to determining that there are not enough students to still provide the new lesson offering.

19. The non-transitory computer-readable medium of claim 15, wherein the logic further causes the computing device to perform at least the following:

provide a user interface to the user to provide an add-on event offering;

receive the add-on event offering from the administrator;

receive indication of registration to the add-on event offering by the user;

notify the administrator of a purchase of the add-on event offering;

reduce a quantity available of the add-on event offering; and mark the add-on event offering as redeemed.

20. The non-transitory computer-readable medium of claim 15, wherein the logic is further configured to perform at least the following:

receive an indication of registration;

determine whether the user is set up for auto-enroll; and in response to determining that the at least one student is set up for auto-enroll, send enrollment confirmation to the user and include the user on an associated schedule and roster.

* * * * *